US008348738B2

(12) United States Patent
Pfeiffer et al.

(10) Patent No.: US 8,348,738 B2

(45) Date of Patent: Jan. 8, 2013

(54) COMPUTER-BASED, INTERACTIVE, MULTIPLAYER CARD SELECTION GAME USING A RANDOMLY GENERATED LIMITED DECK FOR CARD SELECTION

(75) Inventors: Arthur M. Pfeiffer, Palo Alto, CA (US); Daniel Pfeiffer, San Francisco, CA (US)

(73) Assignee: ThwartPoker, Inc., Palo Alto, CA (US)

(*) Notice: Subject to any disclaimer, the term of this patent is extended or adjusted under 35 U.S.C. 154(b) by 484 days.

(21) Appl. No.: 12/731,119

(22) Filed: Mar. 24, 2010

(65) Prior Publication Data

US 2010/0178971 A1 Jul. 15, 2010

Related U.S. Application Data

(63) Continuation-in-part of application No. 10/867,614, filed on Jun. 14, 2004, now Pat. No. 7,717,783.

(60) Provisional application No. 61/211,138, filed on Mar. 26, 2009, provisional application No. 60/479,774, filed on Jun. 18, 2003.

(51) Int. Cl.
*A63F 13/00* (2006.01)

(52) U.S. Cl. ............................... 463/11; 463/13; 463/20

(58) Field of Classification Search .................... 463/11, 463/13, 20, 42

See application file for complete search history.

(56) References Cited

U.S. PATENT DOCUMENTS 4,662,637 A 5/1987 Pfeiffer
4,667,959 A 5/1987 Pfeiffer et al.
4,760,527 A 7/1988 Sidley
4,926,327 A 5/1990 Sidley
5,374,067 A 12/1994 Jones
5,377,973 A 1/1995 Jones et al.
5,558,339 A 9/1996 Perlman
5,586,766 A 12/1996 Forte et al.
5,762,552 A 6/1998 Vuong et al.
5,868,619 A 2/1999 Wood et al.
5,928,081 A 7/1999 Bochichio et al.
5,947,821 A 9/1999 Stone
5,951,012 A 9/1999 Feola
5,971,849 A 10/1999 Falciglia
6,012,720 A 1/2000 Webb (Continued)

OTHER PUBLICATIONS

PCT International Search Report and Written Opinion, 10 pages, Oct. 6, 2005.

*Primary Examiner* — James S McClellan

(74) *Attorney, Agent, or Firm* — Patent Law Group LLP; Brian D. Ogonowsky

(57) ABSTRACT

The present invention relates to computer-based multiplayer games that follow the scoring rules of poker in which players select cards from a second deck of playing cards that is composed of cards randomly selected by the software from a first deck of playing cards for each new hand, where the second deck has fewer cards than the first deck. The introduction of a smaller second deck whose composition and size can vary substantially from hand-to-hand, adds a fascinating and challenging puzzle component to the strategy and chance elements of prior card selection games. The use of a prior art deck that remains unchanged allows each player to tend to rely on a predetermined set of fixed card selection strategies. Whereas, the ever-changing, smaller second deck compels each player to formulate his/her card selection strategy anew for each hand, keeping play fresh and exciting.

28 Claims, 31 Drawing Sheets

U.S. PATENT DOCUMENTS

| | | | | |
|---|---|---|---|---|
| 6,117,011 | A | 9/2000 | Lvov | |
| 6,132,311 | A | 10/2000 | Williams | |
| 6,264,200 | B1 * | 7/2001 | Smith | 273/274 |
| 6,273,820 | B1 | 8/2001 | Haste, III | |
| 6,375,189 | B1 | 4/2002 | Jones | |
| 6,386,973 | B1 | 5/2002 | Yoseloff | |
| 6,390,474 | B1 | 5/2002 | Terminel et al. | |
| 6,454,266 | B1 | 9/2002 | Breeding et al. | |
| 6,508,709 | B1 | 1/2003 | Karmarkar | |
| 6,533,279 | B2 * | 3/2003 | Moody et al. | 273/292 |
| 6,533,658 | B1 | 3/2003 | Walker et al. | |
| 6,679,777 | B2 | 1/2004 | Pfeiffer et al. | |
| 2001/0035608 | A1 | 11/2001 | Hoyt et al. | |
| 2003/0032481 | A1 | 2/2003 | Pfeiffer et al. | |
| 2003/0073476 | A1 * | 4/2003 | Friedman | 463/13 |

* cited by examiner

COMPUTER-BASED, INTERACTIVE, MULTIPLAYER CARD SELECTION GAME USING A RANDOMLY GENERATED LIMITED DECK FOR CARD SELECTION

CROSS-REFERENCE TO RELATED APPLICATIONS

This application is a continuation-in-part of U.S. application Ser. No. 10/867,614, filed Jun. 14, 2004, now U.S. Pat. No. 7,717,783, entitled COMPUTER-BASED, INTERACTIVE, REAL-TIME CARD SELECTION GAME, incorporated herein by reference, which is based on provisional application Ser. No. 60/479,774, filed on Jun. 18, 2003.

This application also claims the benefit of U.S. Provisional Application Ser. No. 61/211,138, filed on Mar. 26, 2009, entitled COMPUTER-BASED, INTERACTIVE, MULTIPLAYER CARD SELECTION GAME USING A RANDOMLY GENERATED LIMITED DECK FOR CARD SELECTION.

TECHNICAL FIELD

The present invention relates to computer-based multiplayer card games that follow the scoring rules of poker.

BACKGROUND

The game of poker is well known and the rules can be found in nearly every card game rulebook. In the game of poker, cards are randomly dealt to each player. Players may have a chance to improve their hand by discarding some of their cards, and receiving replacements, as in draw poker, or more cards may be dealt than needed and the best cards retained, as in the seven-card variations of poker, or in Texas Hold'em or Omaha that also randomly deal community cards that are shared by all the players. Various rounds of betting take place after dealing and after drawing. In five-card stud poker, one card is dealt face down and the four remaining cards are dealt face up one at a time with a round of betting after each face up card is dealt. In Texas Hold'em poker two cards are randomly dealt face down to each player and then five community cards are randomly dealt face up. Betting occurs after the first two cards are dealt to each player, after the first three community cards are dealt and after each of the fourth and fifth community cards are dealt. In all variations of poker, when the betting rounds are completed, the remaining players expose their hands and the winning player collects the money bet. The combinations of cards in the exposed hands in concert with any community cards determine the outcome. Those combinations are well-known—high card, one pair, two pair, three-of-a-kind, straight, flush, full house, four-of-a-kind, and straight flush—and are described in nearly every card game rulebook.

U.S. Pat. No. 4,662,637 to A. Pfeiffer discloses a method of playing a card game in which the players select desired cards from a deck of playing cards, which are delivered to players unless a player requests the same card that another player has requested during the same round of play or was dealt on a previous round, in which case a null card, having no value in determining the outcome of the game, is delivered to the requesting player. Poker scoring rules are used to determine the outcome of the game.

U.S. Pat. No. 4,667,959 to A. Pfeiffer discloses a selector unit and card-storage carousel for playing a card game disclosed in U.S. Pat. No. 4,662,637.

Many games are now played on computing devices and the concept of playing card games over a network such as the Internet is well known. Patents have been granted to new card games that include claims that cover playing the game over the Internet. For instance, U.S. Pat. No. 5,951,012 discloses a poker game where the amount of successive wagers is pre-established by the players; this game may be played on the Internet. Similarly, U.S. Pat. No. 6,012,720 discloses, "enhanced features" of the card game Double Hand; this game may also be played on the Internet.

U.S. Pat. No. 6,679,777 B2 to A. Pfeiffer discloses a method of playing network-based multiplayer card selection games on computing devices that can communicate with each other on the Internet or by other means. These games follow the scoring rules of poker and can involve both actual and virtual players. On each round each player privately selects a card from a deck of playing cards. In one embodiment after each player has made his/her card selection, that player is dealt a null card that has no value if that player's selected card is the same as a card selected by another player on the same or previous round. Otherwise, that player is dealt his/her selected card. In another embodiment after each player has privately made his/her card selection, that player is dealt a null card that has no value if that player's selected card is the same as a card selected by another player on the same round or was dealt to a player on a previous round. Otherwise, that player is dealt his/her selected card.

U.S. patent application Ser. No. 10/867,614 to A. Pfeiffer discloses a method of playing multiplayer card selection games on one or more computing devices that follow the scoring rules of poker and can involve both actual and virtual players. These games use a mixture of cards selected by players and community cards where in some rounds players privately select their cards from the same deck of playing cards and in other rounds community cards are randomly dealt from the same deck of playing cards and shared by the players.

The above-described games by the present inventor have proven to be of great entertainment and commercial value; however, it is sometimes desirable to modify games to add new strategies, add variety to the games, make the games more competitive, enable the games to be displayed on smaller devices, etc.

SUMMARY

Embodiments of the present invention are described that vary aspects of the inventor's previous games involving the players' selection of cards. The new embodiments offer substantial improvements over the games disclosed by the inventor in U.S. Pat. Nos. 4,662,637, 4,667,959, 6,679,777 B2, and U.S. patent application Ser. No. 10/867,614, all incorporated herein by reference. All of the aforementioned methods use a deck of playing cards face up for each hand from which each player in a round privately selects a specific card and, after all players have made their card selection, each player either is dealt a no-value null card when there is conflict, or otherwise is dealt his/her selected card.

In the new embodiments described herein, a hand starts with a larger first deck of playing cards, and then software creates a smaller second deck of cards that is composed of cards randomly selected from the first deck of cards for that hand. The smaller second deck of cards contains fewer cards than the first deck of playing cards. In most rounds, players privately select their specific cards from the smaller second deck face up. After all players have made their card selection in a round, each player is either dealt a no-value null card when there is conflict, or otherwise is dealt his/her selected card. The number of cards in the smaller second deck may also vary from hand-to-hand. A card selection deck that changes in composition and possibly in size from hand-to-hand creates a totally new game dynamic over the prior art. The phrase "randomly selected" as used in this document represent a selection process where the results are unpredictable.

The cards each player receives or can use are referred to as that player's hand. A hand also refers to a single game cycle that consists of a series of rounds, at the end of which, the player with the best set of cards (hand), according to predetermined rules, is the declared or determined to be the winner.

A 52-card standard deck for playing regular poker consists of four suits, clubs, diamonds, hearts and spades with thirteen cards in each suit, ace through king In regular poker, good combinations such as a straight flush, four-of-a-kind, and full house are rare. Most people are reluctant to bet much when they hold only one or two pair. As a result, too many people drop out of the betting early, which may frustrate even people with good hands. One common solution is to introduce wild cards to increase the chances of receiving a good hand and thus keep the game interesting. There are other forms like Turkish poker where some of the cards, like all the twos thru fives, are permanently removed from the deck. In the present invention, the first deck of cards can be any of the above forms or others as well.

Playing a game that uses the same deck of playing cards for card selection from hand-to-hand allows players to win over time, by employing a relatively small set of fixed strategies for card selection. This is so because the number of different ways to build or create each type of hand remains constant and, a player knows these patterns ahead of time. Therefore, in a game that has a set hierarchy of hand structures and uses a fixed deck (especially a standard 52-card deck) from hand-to-hand for card selection, a player can generally rely every time on a small number of predetermined, fixed hand structures as a guide in selecting cards.

The use of a smaller, limited second deck that is randomly selected differently by the software from hand-to-hand from a larger fixed first deck, such as a standard 52-card deck, requires each player to pay close attention to the composition of the limited deck. The number of different ways to build or create each type of hand varies dramatically as the composition of the limited second deck changes based on software random selection. This variation in composition becomes even more pronounced by changing the number of cards in the limited deck. Since both the composition and possibly the size of the limited deck change from hand-to-hand, the use of predetermined, fixed strategies is ineffective for card selection, and a player must carefully evaluate the composition of the limited deck each time in determining what type of hand he/she should try to build.

Compared to using a fixed, full deck of playing cards, the use of a smaller limited second deck, that has been randomly selected from a larger fixed first deck and varies from hand-to-hand, also significantly reduces the opportunity for collusion in a card selection game, especially when time limits are introduced. It is much more difficult to devise and effectuate a collusion scheme when the deck keeps changing from hand-to-hand, without knowing what the new card selection deck will be ahead of time. Furthermore, any such scheme would have to be extremely sophisticated to be successful and, therefore, would possess certain unique characteristics that would stand out under scrutiny. The use of a limited deck as described above for a card selection game with time limits makes collusion no more of a problem than now exists with regular poker and perhaps less of one.

In a variation, a set of community cards, such as three, are first randomly selected by the computer from the original deck and made available to all players prior to the players selecting cards. The community cards may be randomly selected from either the original 52-card deck or from the limited deck. In another variation, an additional one or more community cards are also randomly selected and dealt to the players after all rounds of player selection are completed.

DETAILED DESCRIPTION OF THE INVENTION

Figure 1A:
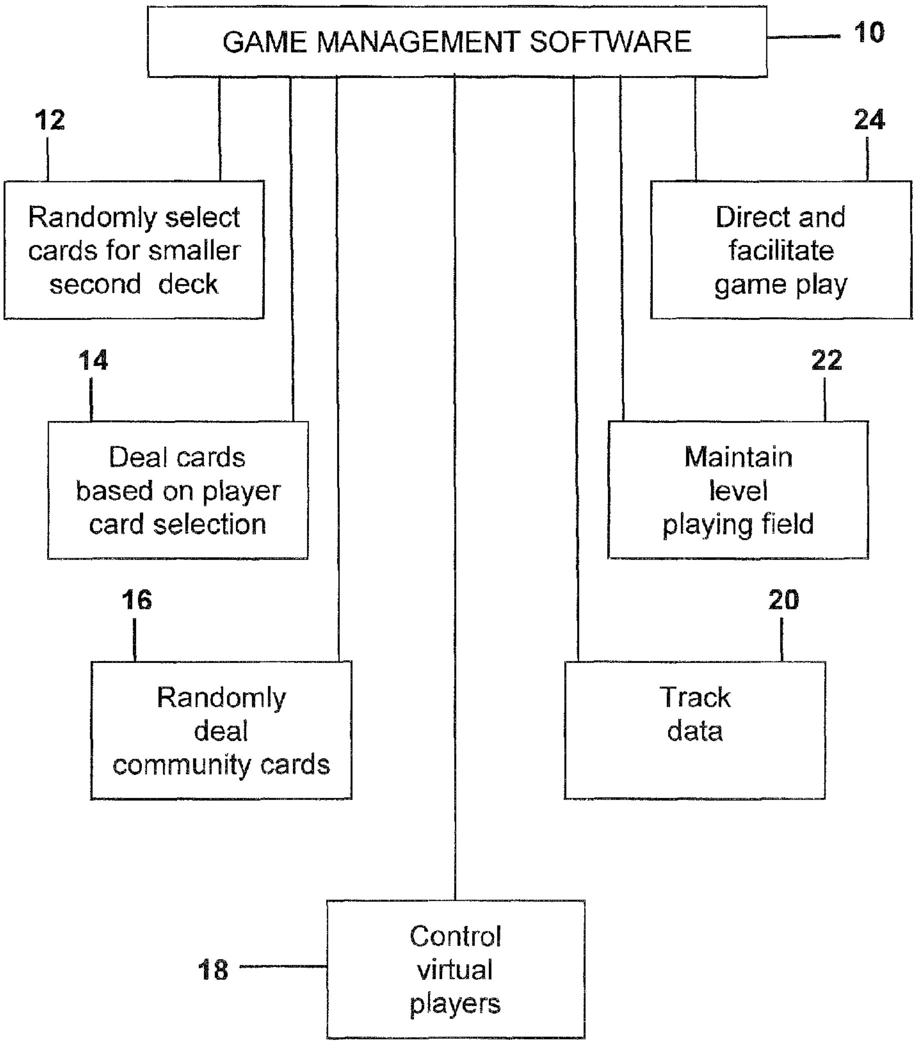
FIG. 1A is a block diagram that enumerates the various functions of the game management software.

The present invention is a method of playing computerized multi-player card games that follow the scoring rules of poker. For the majority of these games, the quality of a player's hand is due to skill and strategy rather than "the luck of the draw". In all embodiments, players privately request desired cards in one or more rounds from a smaller second deck of cards face up, that is composed of cards randomly selected by the software from a first deck of playing cards for each new hand. The second deck, including any community cards usable by any of the players, always has fewer cards than the first deck. Each hand ends with the winning player having the best set of cards of all the active players, according to predetermined rules, after a specified number of rounds have been played or there is only one remaining active player. In one embodiment, after all active players have selected a card in a round, a null card, which has no value in determining the outcome of the game, is delivered to players who request the same card as another player has requested on the current round or a previous round. Otherwise, a player is dealt his/her selected card. In another embodiment, after all active players have selected a card in a round, a null card is delivered to players who request the same card as another player has requested on the current round or has been dealt to a player on a previous round. Otherwise, a player is dealt his/her selected card.

The computer-based multiplayer card selection game, as disclosed herein, can be played in a variety of modes and operating environments. In every embodiment, each active player selects his/her card or cards from the same smaller second deck of cards in one or more rounds. For each new hand, the smaller second deck is randomly selected from a larger fixed first deck of cards and, including any community cards, contains fewer cards than the first deck. In one embodiment of the invention, an actual player using a single computing device can play the game against one or more virtual players, with play directed and facilitated by game management software that also controls the virtual players. In another embodiment, two or more actual players can play against each other, each using a separate computing device, with play directed and facilitated by game management software.

Tournaments can be conducted. They all involve two or more actual players initially and consist of one or more hands played, where each actual player uses a separate computing device. In one embodiment of the invention, a tournament involves two or more actual players, each directly playing against one or more virtual players on his/her computing device. In this embodiment, the actual players indirectly play against each other to determine which actual player is the tournament winner. At the start of each hand, the number of virtual players each actual player plays against is the same, though the number of virtual players at the start of each hand may vary from hand-to-hand. In each hand played, each actual player receives a numerical score based on predetermined scoring rules, regardless of whether or not the actual player had the best poker hand playing against the virtual players on his/her computing device. Game management software directs and facilitates play, controls the virtual players and keeps track of the total score of each actual player. After each active, actual player has played the same number of predetermined hands or a specified amount of time has elapsed or only one active, actual player remains, the tournament winner is then the active, actual player with the highest total score. Game management software maintains a level playing field for the actual players. It insures that when all card and bet selections for 2 or more actual players are sequentially identical, then all the card and bet selections for each set of their corresponding virtual players are also sequentially identical. A random number generator is at the heart of the artificial intelligence (AI) code logic that controls the virtual players. To maintain a level playing field, game management software insures that both the AI code used to control an actual player's set of virtual players and the starting value or values used to seed the AI code random number generator are the same for each actual player. The game management software also insures that when community cards are dealt in a hand, they are the same for all active, actual or virtual players. These tournaments can be either asynchronous, where the actual players play at different times or synchronous, where the actual players all play at the same time.

There are several types of tournaments where the actual players directly play against each other, each using a separate computing device. In one embodiment of the invention, the tournament starts with no more than ten actual players, all of them playing against each other at the same table. Game management software directs and facilitates play. It insures that when community cards are dealt in a hand, they are the same for all active players. In each hand played, each active player receives a numerical score based on predetermined scoring rules. After each active player has played the same number of predetermined hands or a specified amount of time has elapsed or only one active player remains, the tournament winner or winners are then declared to be the one or more active players with the highest final score.

In another embodiment, the tournament starts with more than seven actual players and at least two tables of play. Each actual player uses a separate computing device. Game management software directs and facilitates play. It insures that when community cards are dealt in a hand, they are the same for all active players. For each new hand, game management software randomly assigns each actual player to a table, so that as long as there are enough active, actual players, each actual player usually plays against different actual players from hand-to-hand. Game management software also populates the tables with virtual players when necessary, so that for each new hand every table starts with the same number of players. In each hand played, each active, actual player receives a numerical score based on predetermined scoring rules, regardless of whether or not that actual player had the best poker hand at his/her table. Game management software keeps track of the total score of each actual player. After each active actual player has played the same number of predetermined hands or only one active, actual player remains, the tournament winner or winners is then declared to be the one or more active, actual players with the highest total score of all active, actual players. To maintain a level playing field, game management software also insures that when community cards are dealt in a hand, they are the same for each table and all active, actual or virtual players.

In another embodiment, the tournament involves betting and normally starts with more than five actual players and at least two tables of play. Each actual player uses a separate computing device. Each player starts the tournament with the same amount of real or play money for betting. At the start of the tournament software assigns each player to a table. Game management software directs and facilitates play. It insures that when community cards are dealt in a hand, they are the same for all active players. As play progresses from hand-to-hand, players are eliminated from the tournament as they lose all their money. When appropriate, the software consolidates the tables. The tournament ends when one player has won all the money.

All of the embodiments described above require game management software. FIG. 1A enumerates some of the basic functions that the Game Management Software 10 performs. These are: a) randomly select cards from larger first deck to form smaller second card selection deck that including community cards has fewer cards than the first deck 12: b) determine what cards are dealt to each player based on player card selection 14; c) when applicable, randomly deal community cards 16; d) when applicable, control virtual player card selection and betting 18; e) keep track of all game data 20; f) maintain level playing field for various tournament modes 22; and g) in general, direct and facilitate game play 24.

Several different operating environments are suitable for playing the game when more than one actual player is involved. Under these circumstances, the game can best be played over the Internet in order to accommodate the broadest range of players, no matter where they are located. While the Internet is often the preferred operating environment for playing the game with more than one actual player, other operating environments are also popular for such game play. For instance, video game hardware as used in game arcades can be linked together by a local area network to allow actual players to compete against each other. Hand-held computing devices such as cell phones with Bluetooth capability or Personal Digital Assistants with infrared capability enable 2 or more actual players, each with such a separate computing device, to play against each other.

Networked environments such as the Internet or locally linked computing devices in a game arcade employ the client-server software model for game play and communication. Such a system consists of two software modules, configured either as "client software" or "server software", to manage and facilitate game play. Together, these two software modules provide all the functionality of the game management software described in FIG. 1A. Each player's computing device has a copy of the "client software". When the "server software" resides on a computer separate from each player's computing device, the host computer for the "server software" is called a server and the client-server model is called two-tier. When a separate server is not used and the "server software" also resides on a player's computing device, the client-server software model is called single step. Functionally there is no difference between the two-tier and single step client-server models. A common characteristic of client-server systems is that the "server software" manages and effects all communication to and from the actual players.

Figure 1B:
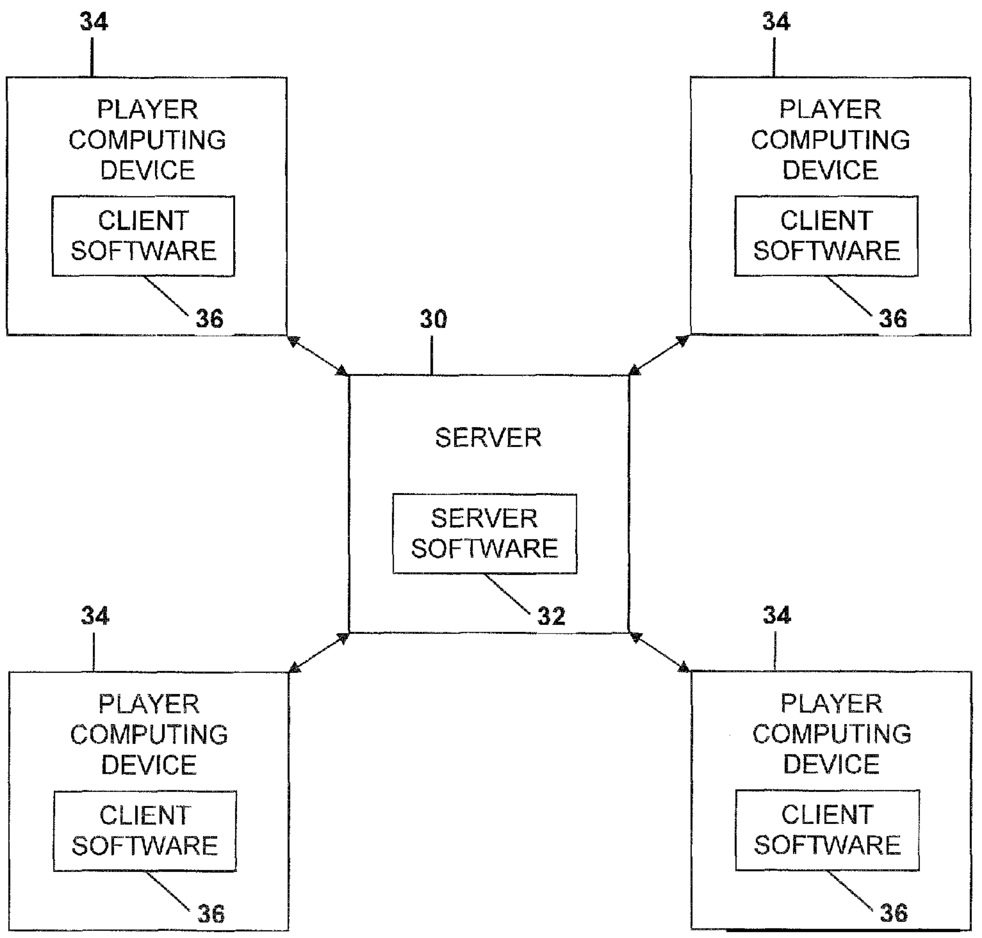
FIG. 1B is a block diagram that illustrates the hardware/software configuration for a two-tier client-server networked operating environment.

The Internet employs the two-tier client-server model as depicted in FIG. 1B. Each player's computing device 34 contains a copy of the "client software" 36 (which can be downloaded from a Web page on the Internet) that provides him or her with the capability to select and view cards (either as images or descriptive text) and bets. The "server software" 32 resides on a computer called a server 30 that is separate from each player's computing device 34.

When actual players directly play against each other in a client-server network system, whether two-tier or single step, game management functionality is usually but not necessarily distributed between "client software" and "server software" in the following manner. The "client software" communicates each player's card or bet selection to the "server software" (which will in turn communicate some of this information to the other players). The "server software" provides overall management of game flow by receiving card and bet selection information from each player, as well as game selection information from the dealer. It randomly selects the cards for the smaller, second deck and when applicable, randomly selects the community cards. For each active virtual player, it determines that player's selected card in a card selection round and determines that player's selected bet, when that virtual player's betting turn comes. For each player card selection, it determines whether the desired card or a null card (which may be represented by a joker) is dealt to that player. The "server software" 32 also sends information to each active player regarding when a new game or hand begins, which player is the dealer only for game selection, what game the dealer selected, what cards are in the smaller second card selection deck, what the community cards are, if applicable, and, in each card selection round, what card is dealt to that player, what card is dealt to each of the other players for a round where cards are dealt face-up, and in a betting round, which player is the current bettor, what bet the current bettor made, and when a hand is over, the rank and suit of each face-down card and each null card's associated selected card for the active players, which players won and the winning score.

When actual players indirectly compete against each other by each playing a similar set of virtual players on his/her computing device, then most of the game management software and functionality described above is often but not always shifted to the "client software" on each player's computing device. In that instance the "server software" sends the same value or values to each "client software", for seeding the game management random number generator, to produce the same second card selection deck, the same community cards when applicable, and to control the virtual players in the same fashion, across the different players' computing devices. Also, the "server software" will receive from and communicate to the actual players, each active actual player's score at the end of each hand.

Figure 1C:
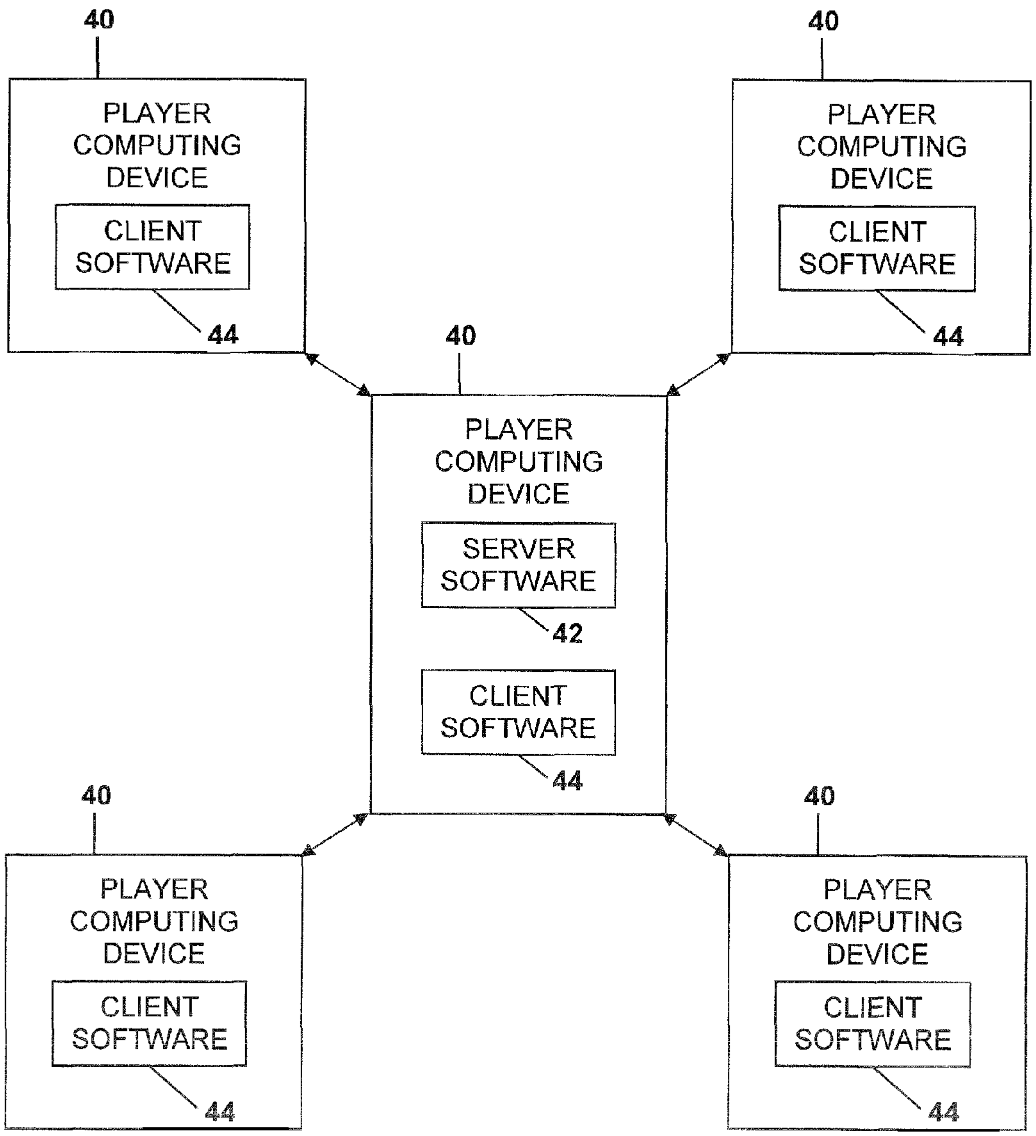
FIG. 1C is a block diagram that illustrates the hardware/software configuration for a single step client-server networked operating environment.

In the single step client-server system, as may be used in a game arcade employing a local area network, the server software 42 resides on one or more of the player's computing devices 40 along with the client software 44 as depicted in FIG. 1C. As previously mentioned, there is no functional difference between the two-tier and single step client-server systems. Therefore, the above discussions, regarding how game management software and functionality are distributed between "client software" and "server software" apply equally to single step, depending upon whether the actual players play directly or indirectly against each other.

Figure 1D:
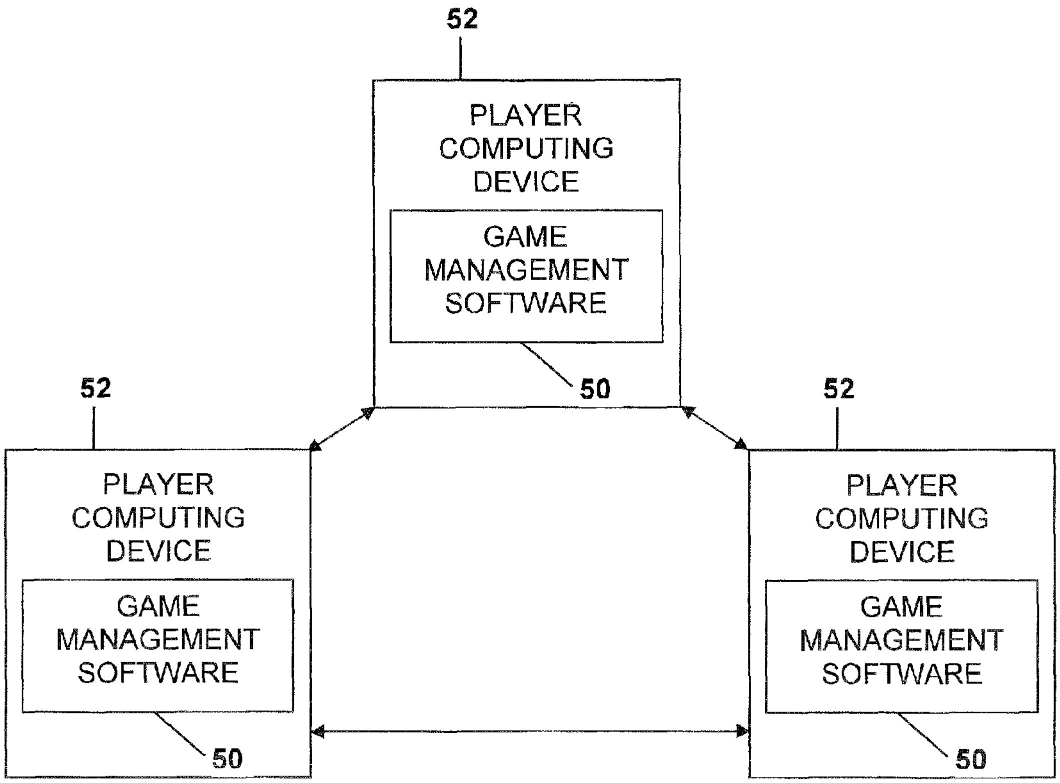
FIG. 1D is a block diagram that illustrates the hardware/software configuration for a peer-to-peer operating environment.

Another operating environment for actual players to play the game against each other is called peer-to-peer, where players directly communicate with each other. In this operating environment there is no "server software". Here each hand-held computing device is preloaded with software for overall game management, determining what cards are dealt, controlling the virtual players, playing the game and enabling the players to directly communicate with each other. FIG. 1D shows the game management software 50 residing on each player computing device 52, with each player's computing device able to directly communicate with every other player's computing device involved in the game.

In one embodiment of the invention, an actual player has a copy of the necessary game management software on his/her computing device, in order to play the game against one or more virtual players on his/her computing device.

In one embodiment of the invention, two or more actual players each have a copy of the necessary game management software on their respective computing device. The computing devices are connected together in a client-server networked environment in order for the actual players to play the game directly against each other.

In another embodiment, two or more actual players each have a copy of the necessary game management software on their respective computing device, in order for each to play the game against a set of virtual players on his/her computing device, where the computing devices are connected together in a client-server networked environment that maintains a level playing field between the actual players, to permit them to play the game indirectly against each other.

In one embodiment of the invention, two or more actual players each have a copy of the necessary game management software on their respective mobile computing device, where the computing devices can directly communicate with each other peer-to-peer using Bluetooth or a similar technology, so that the players can play the game directly against each other.

In another embodiment, two or more actual players each have a copy of the necessary game management software on their respective mobile computing device, in order for each to play the game against a set of virtual players on his/her computing device, where the computing devices can directly communicate with each other peer-to-peer using Bluetooth or a similar technology, so that a level playing field is maintained between the actual players and the players can play the game indirectly against each other.

In one embodiment of the invention, on the first round, each player, actual or virtual privately selects a card from a larger first deck of playing cards displayed face up to all the players. After every player has made his/her card selection, each player either is dealt a no-value null card when there is conflict, or otherwise, is dealt his/her selected card. The software then generates a smaller second deck of cards that is composed of both the cards selected by the players on the first round and cards randomly selected by the software from the larger first deck of cards. The second deck contains fewer cards than the first deck and is displayed face up to all the players. On one or more subsequent rounds each active player privately selects a card from the smaller second deck. After every active player has made his/her card selection in a round, each active player either is dealt a no-value null card when there is conflict, or otherwise, is dealt his/her selected card. After a predetermined number of rounds have been played or only one active player remains, the software identifies the active player with the best hand of cards, according to predetermined rules of play.

In another embodiment of the invention, after a predetermined number of rounds have been played where players select cards, one or more community cards are randomly dealt that are usable by all active players in forming a hand. The community cards may be randomly dealt from either the larger first deck of cards or the smaller second deck of cards.

In another embodiment of the invention, at the start of each hand the software first generates a smaller, second deck of cards composed of cards randomly selected by the software from a larger first deck of playing cards. The second deck contains fewer cards than the first deck and is displayed face up to all the players. On one or more rounds, each active player, actual or virtual, privately selects a card from a smaller second deck. After every active player has made his/her card selection in a round, each active player either is dealt a no-value null card when there is conflict, or otherwise, is dealt his/her selected card. After a predetermined number of rounds have been played or only one active player remains, the software identifies the active player with the best hand of cards, according to predetermined rules of play.

In an additional embodiment of the invention, on at least one round, though not every round, every player, actual or virtual, receives a card randomly dealt by the software from the cards remaining in the smaller second deck. The determination of which round or rounds will feature such randomly-dealt cards can be programmed in default settings for the game, set by a player before the game starts, or may be randomly set by the software before the game starts.

In yet another embodiment of the invention, cards in any round may be dealt face-up to every player. The determination of which round or rounds will feature cards that are dealt face-up and which round or rounds will feature cards that are dealt face-down can be programmed in default settings for the game, set by a player before the game starts, or may be randomly set by the software before the game starts.

In one embodiment of the invention, one or more community cards are first randomly selected by the software from a larger first deck of playing cards and displayed face up to all the players. One or more of the community cards may be used by any of the players in forming a hand. The software then generates a smaller second deck of cards that is composed of cards randomly selected by the software from the first deck of playing cards. The second deck including community cards contains fewer cards than the first deck and is displayed face up to all the players. Since the community cards are displayed separately, the displayed second deck used for card selection by the players may or may not contain the community cards. When community cards are also displayed as part of the second deck they are not available for player card selection in a round. In each of one or more rounds, players privately select cards from the smaller second deck. After every active player has made his/her card selection in a round, each active player either is dealt a no-value null card when there is conflict, or otherwise, is dealt his/her selected card. After a predetermined number of rounds have been played or only one active player remains, the software identifies the active player with the best hand of cards, according to predetermined rules of play. As with the other embodiments listed above, the determination of whether this embodiment will be employed can be programmed in default settings for the game, set by a player before the game starts, or may be randomly set by the software before the game starts. If an actual player wishes to use a community card for his or her best hand, the player will indicate his or her preference by highlighting the card. In other embodiments, the software can automatically determine what the best hand is for each player.

In another embodiment, the community cards are randomly selected from the smaller second deck of cards instead of the larger first deck of cards.

In another embodiment, an additional one or more community cards are also randomly selected by the computer and dealt to the players after all rounds of player card selection are completed. This adds an additional element of strategy to the game, since players with poor hands may elect to remain in the game hoping that a favorable community card is dealt.

If the players selected their cards from a 52-card deck after the community cards were removed from the deck, the game would be similar to that described in my U.S. application Ser. No. 10/867,614. This present disclosure also supports claims that cover the games described in my U.S. application Ser. No. 10/867,614, since having the players select cards from a limited deck of cards randomly selected from the original 52-card deck is a limiting variation on my earlier game, even though the limited deck provides some added benefits to the basic game. In either case, the players select from decks or sets of cards.

In another embodiment of the invention, at the start of a hand, the software generates a smaller second deck of cards that is composed of cards randomly selected by the software from a larger first deck of playing cards. The second deck contains fewer cards than the first deck and is displayed face up to all the players. In the first one or more rounds, each active player, actual or virtual, privately selects a card from the smaller second deck. After every active player has made his/her card selection in a round, each active player is either dealt a no-value null card when there is conflict, or otherwise, dealt his/her selected card. After a predetermined number of rounds of card selection have been played, there are one or more rounds where in each round the software randomly selects a community card from the smaller second deck, excluding any cards that have been previously selected by any of the players and displays it face up to all the players. One or more of the community cards may be used by any of the players in forming a hand. After a predetermined number of rounds have been played or only one active player remains, the software identifies the active player with the best hand of cards, according to predetermined rules of play.

In another embodiment of the invention, at the start of a hand, the software generates a smaller second deck of cards that is composed of cards randomly selected by the software from a larger first deck of playing cards. The second deck contains fewer cards than the first deck and is displayed face up to all the players. In the first one or more rounds, each active player, actual or virtual, privately selects a card from the smaller second deck. After every active player has made his/her card selection in a round, each active player is either dealt a no-value null card when there is conflict, or otherwise dealt his/her selected card. After a predetermined number of rounds of card selection have been played, there are one or more rounds where in each round the software randomly selects a community card from the smaller second deck excluding any cards that have been previously selected by any of the players and displays it face up to all the players. One or more of the community cards may be used by any of the players in forming a hand. After a predetermined number of rounds have been played or only one active player remains, the software identifies the active player with the best hand of cards, according to predetermined rules of play.

In another embodiment of the invention where community cards are involved, the best hand of cards according to predetermined rules of play must use at least one of the community cards.

Players may select more than one card per round in another embodiment. Each player selects the same number of cards and specifies the order of selection. Game software will determine which cards to deal and in what order. For instance, if two cards are selected per round, the players choose the cards and the order of selection, the game software then analyzes the players' first card choice and then deals the appropriate cards accordingly, and then the game software analyzes the players' choice for a second card and then deals the appropriate cards. The determination of which round or rounds will feature multiple card selections by the players can be programmed in default settings for the game, set by a player before the game starts, or may be randomly set by the software before the game starts.

In other embodiments any round may be a betting round. The determination of which round or rounds will feature betting may be programmed in default settings for the game, set by a player before the game starts, or randomly set by the software before the game starts.

In other embodiments any card selection round may involve a specified time limit within which each player must select a card. A player who fails to select a card within the specified time limit is automatically dealt a null card by the software. The determination of which round or rounds will feature a card selection time limit may be programmed in default settings for the game, set by a player before the game starts, or randomly set by the software before the game starts.

In other embodiments any betting round may involve a specified time limit within which each player must indicate his/her bet on that player's betting turn. A player who fails to indicate his/her bet within the specified time limit is automatically indicated as having called or checked by the software, depending upon whether there was a previous bet or not by another player in the current round. The determination of which round or rounds will feature a betting time limit may be programmed in default settings for the game, set by a player before the game starts, or randomly set by the software before the game starts.

In other embodiments the number of rounds may be one or more. The determination of the number of rounds may be programmed in default settings for the game, set by a player before the game starts, or randomly set by the software before the game starts.

The game may also function in a standalone system where no connection to a network and communication with other computing devices is necessary to play the game. In this embodiment, there is one actual player using a computing device. The other players are virtual players. All necessary game management software may be pre-loaded, downloaded to the player's computing device from a network or contained on some computer-readable media such as a memory stick, or floppy or compact disk.

In one embodiment of the invention, the number of cards in a smaller second deck that contains cards that have been randomly selected by the software for each new hand from a larger first deck of playing cards remains fixed from hand-to-hand. The second deck, including any community cards, contains fewer cards than the first deck. The determination of the number of cards in the smaller second deck may be programmed in default settings for the game, set by a player before the game starts, or randomly set by the software before the game starts.

In another embodiment, the number of cards in a smaller second deck that contains cards that have been randomly selected by the software for each new hand from a larger first deck of playing cards varies from hand-to-hand. The second deck, including any community cards, contains fewer cards than the first deck. The number of cards in the smaller second deck is randomly set by the software for each new hand to some number between a predetermined minimum value and a predetermined maximum value. The determination of the minimum and maximum size of the smaller second deck may be programmed in default settings for the game, set by a player before the game starts, or randomly set by the software before the game starts.

These embodiments may be combined within one game. For instance, in addition to at least one round in which the dealt cards are based on player card selection, a game may feature some rounds where each player receives a randomly-dealt card chosen by the game software as well as some rounds where a single randomly-dealt community card is dealt face-up and may be used by any of the players.

For all of the embodiments of the invention, the computing device used by an actual player has a display screen. Depending upon the type of display screen and computing device, when required, an actual player can point to and select on the display screen a desired card from the card selection deck or a desired bet from a bet menu or bet buttons. This is accomplished by means of a touch screen or keyboard, or when a cursor is involved, by means of a mouse, trackball or some other similar selection device.

Thirty-one drawings are included (FIGS. 1A-D, 2A-T, 3A-G). Set one (FIGS. 1A-D) shows 4 block diagrams for game management functionality and various operating environment configurations that have already been referenced. Set two (FIGS. 2A-T) shows 20 screen drawings for a card selection game that involves 3 community cards and one or more tables with 3 players playing directly against each other at each table. The community cards are first randomly selected by the software from a standard 52-card deck of playing cards and displayed face up on each actual player's screen. The community cards are usable by all players in forming a hand. Then there are four rounds of player card selection, where in each round each active player first privately selects a card from a smaller second deck of cards that has been randomly selected by the software from a standard 52-card deck. The second deck, including the community cards, has fewer cards than the standard 52-card deck. After all players have selected their card in a round, each player is dealt a card. This card is a no-value null card when a player either selects a card that is the same as one selected by another player in the current round or is the same as a card dealt to another player in a previous round. Otherwise, the player is dealt his/her selected card. Cards are dealt face down in the first card selection round and face up in each of the next three rounds. In this example, the second deck contains 19 cards excluding the community cards. The word "randomly" is used to represent a selection process where the results are unpredictable. The second deck is displayed face up on each actual player's screen. In this example, the displayed deck also includes the 3 community cards. For this example, the size of the smaller second deck excluding the community cards was determined by system software that randomly selected a number between a predetermined minimum of 12 cards and predetermined maximum of 28 cards. The actual player is named NAME1. The other 2 players, NAME2 and NAME3 could each be either actual or virtual. Note that in these drawings a large X on a card indicates that it is a null card.

Figure 2A:
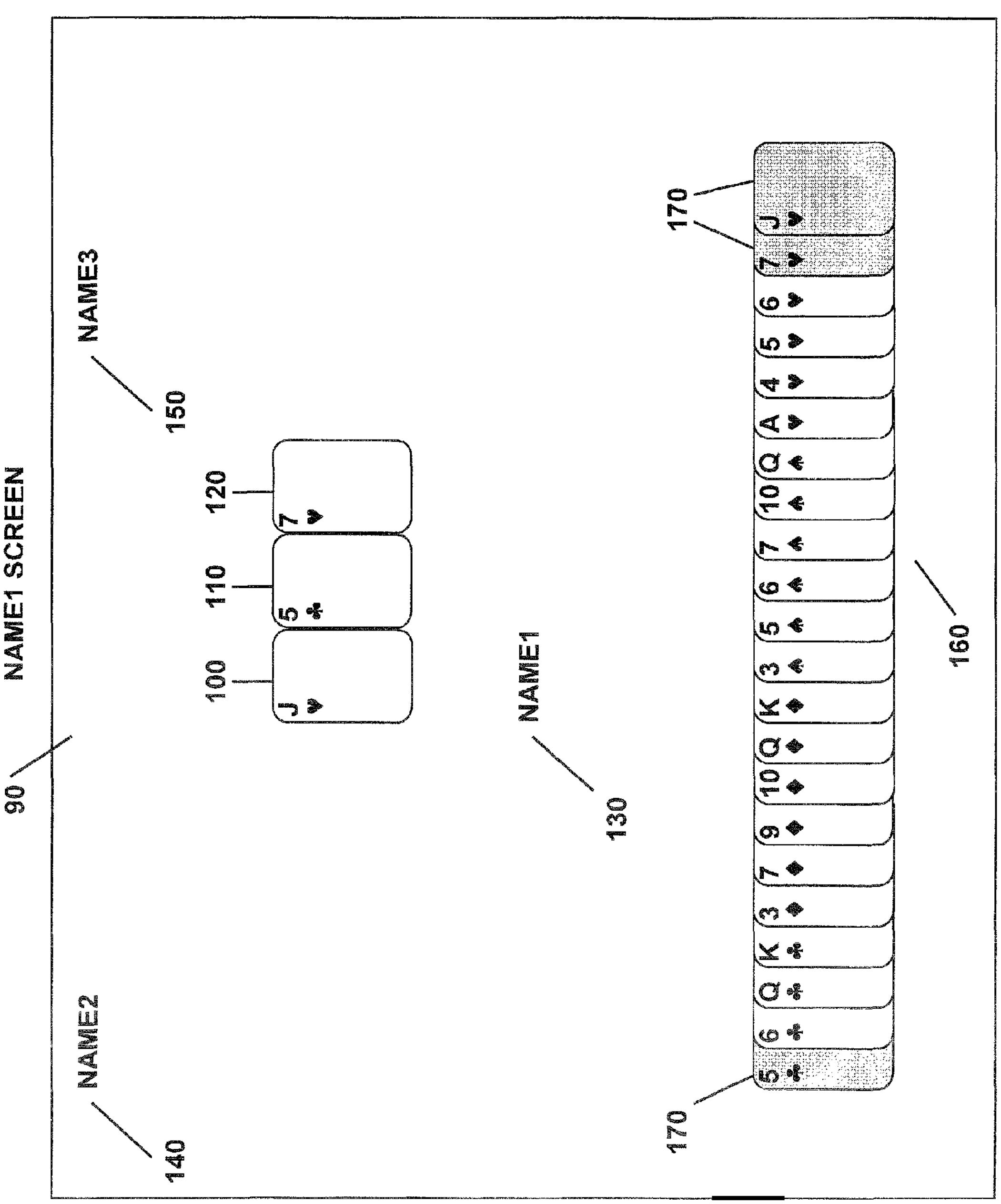
FIG. 2A shows a first player's screen in a 3-player game after 3 community cards are randomly dealt but before any of the 4 card-selection rounds have occurred.
Figure 2B:
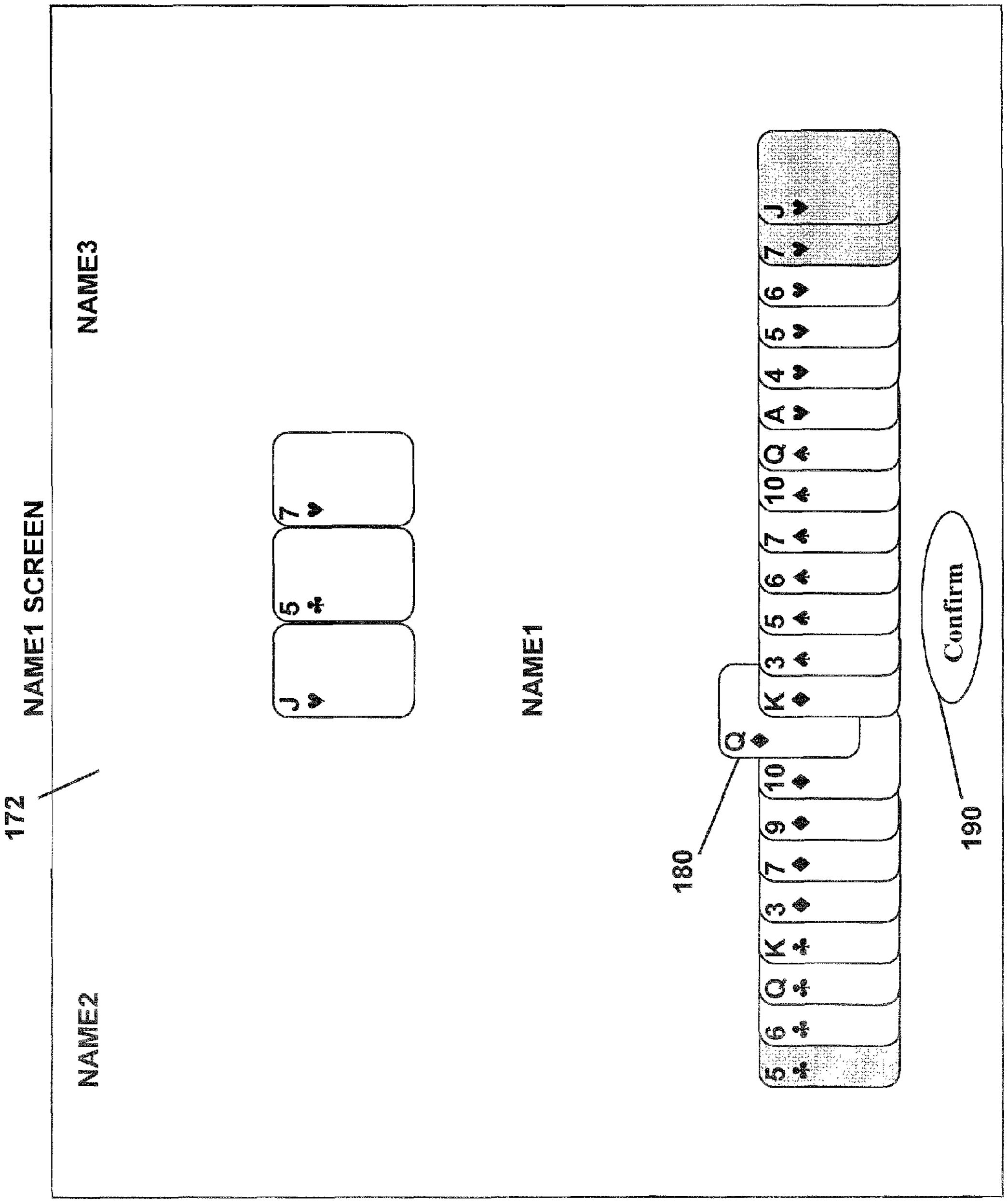
FIG. 2B shows the first player's screen, for the same game as FIG. 2A, on the first card selection round, when a possible card choice has been indicated but not confirmed.
Figure 2C:
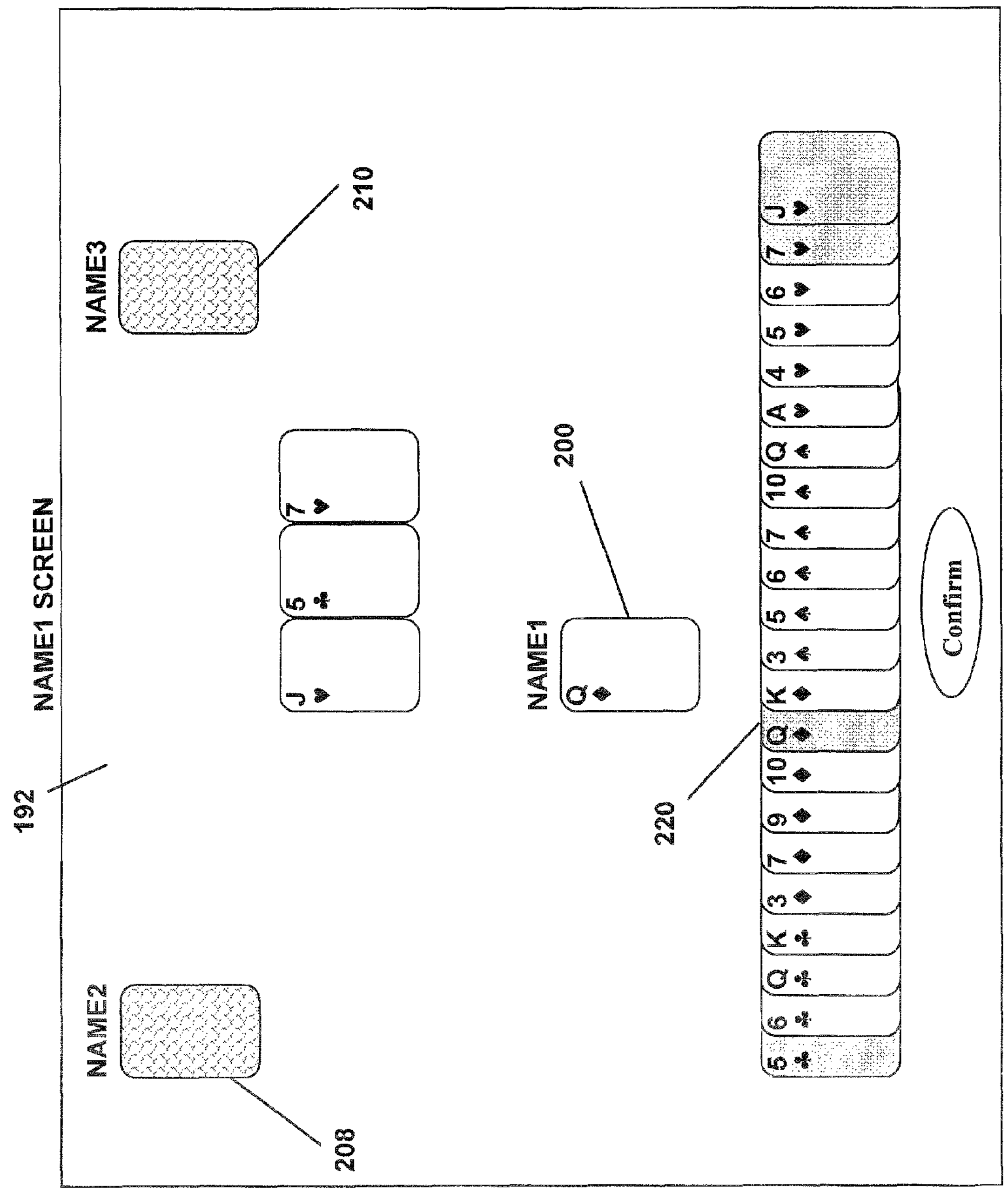
FIG. 2C shows the first player's screen, for the same game as FIG. 2A, after all 3 players have selected and been dealt a face down card in the first card selection round.
Figure 2D:
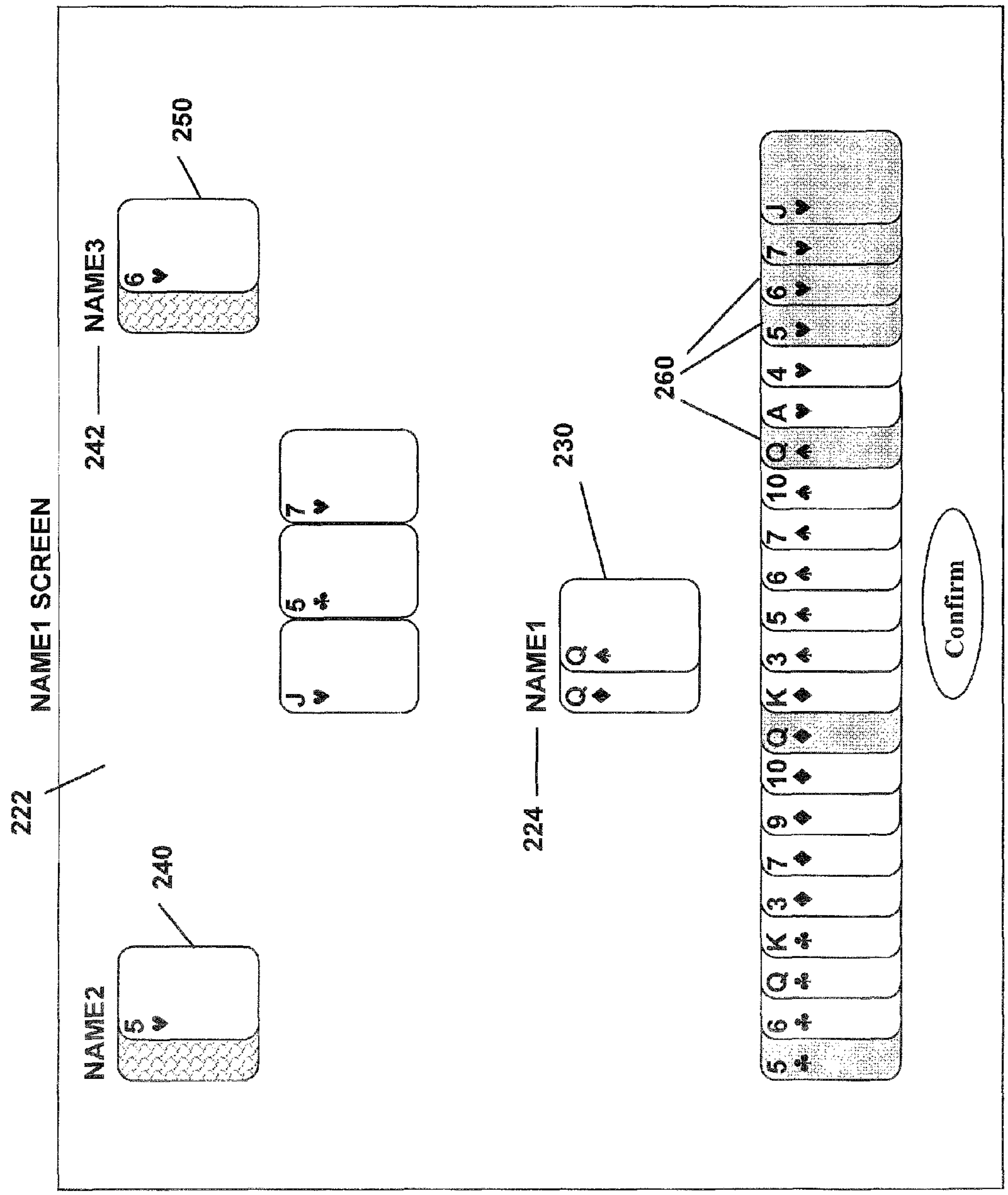
FIG. 2D shows the first player's screen, for the same game as FIG. 2A, after 2 card selection rounds have been completed.
Figure 2E:
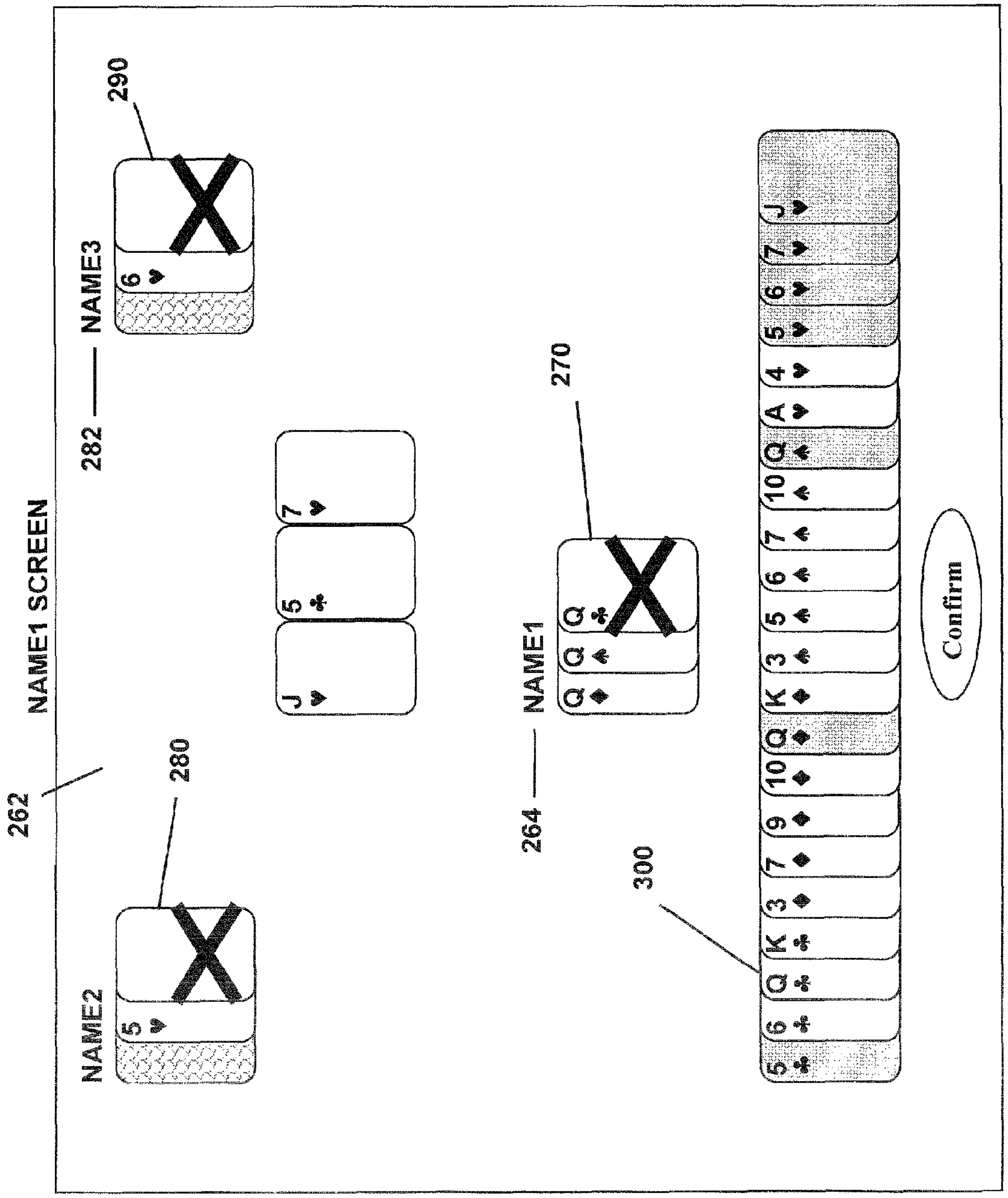
FIG. 2E shows the first player's screen, for the same game as FIG. 2A, after 3 card selection rounds have been completed.
Figure 2F:
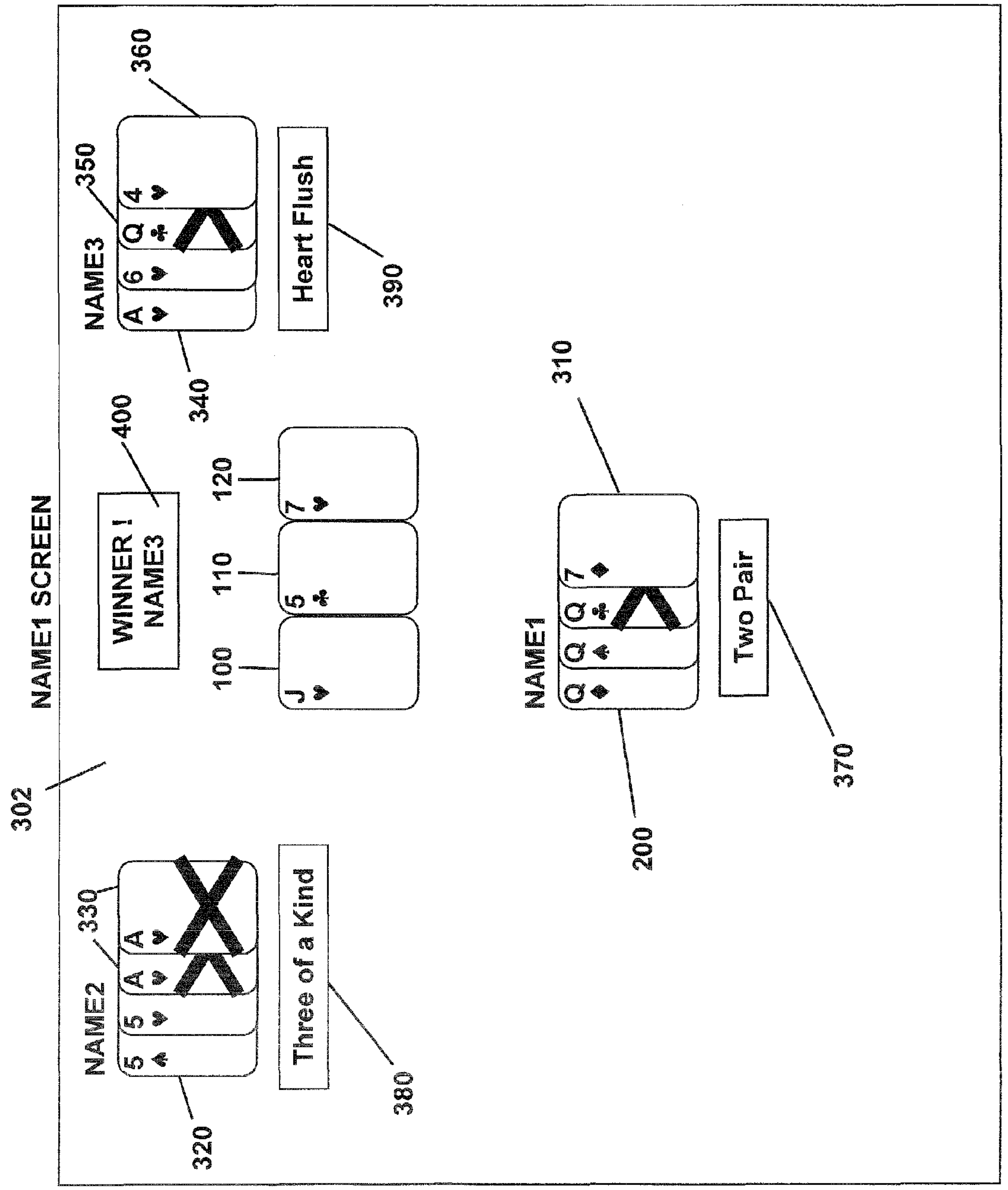
FIG. 2F shows the first player's screen, for the same game as FIG. 2A, after all card selection rounds have been completed and a winner is declared.
Figure 2G:
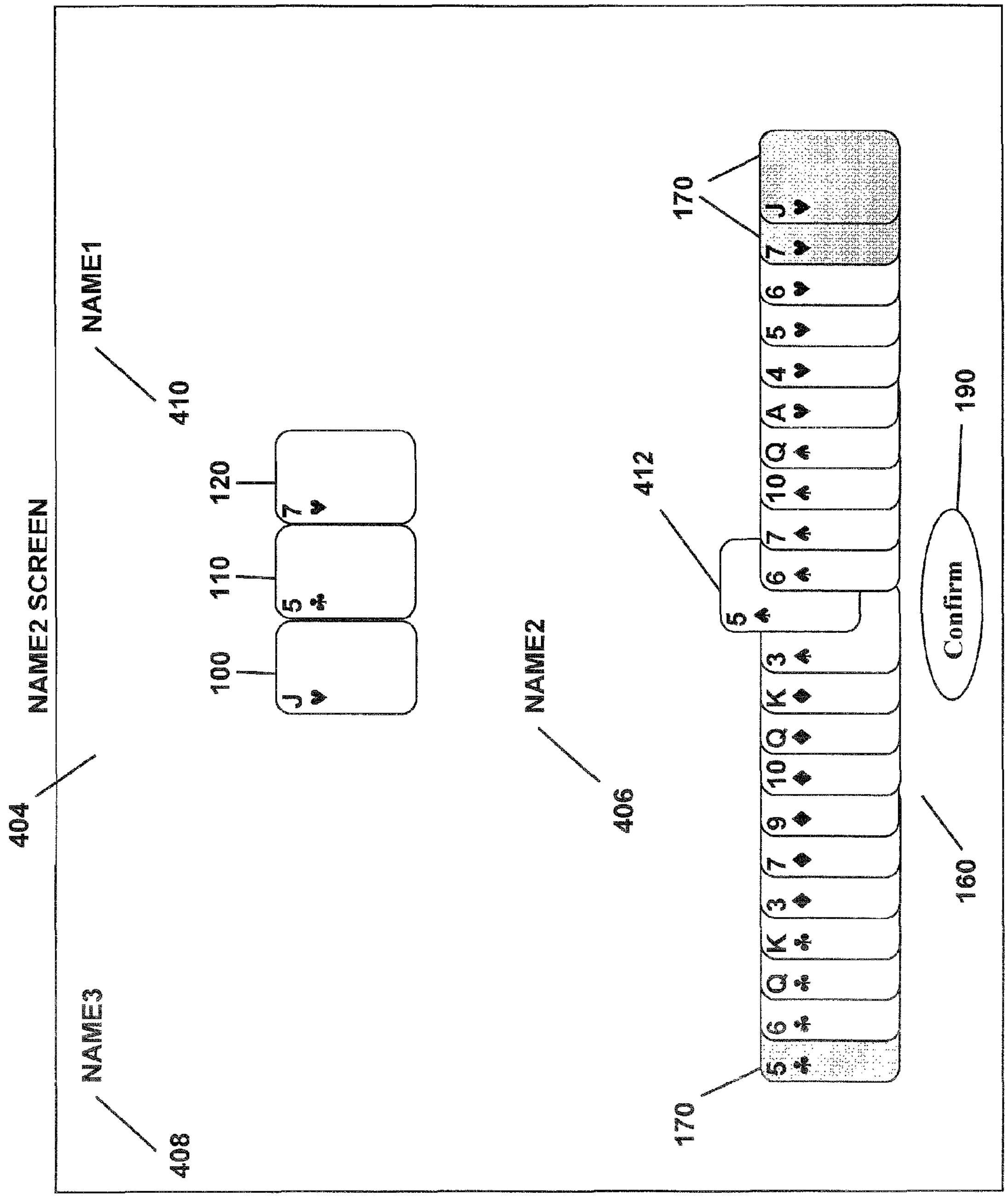
FIG. 2G shows a second player's screen, for the same game as FIG. 2A, on the first card selection round, when a possible card choice has been indicated but not confirmed.
Figure 2H:
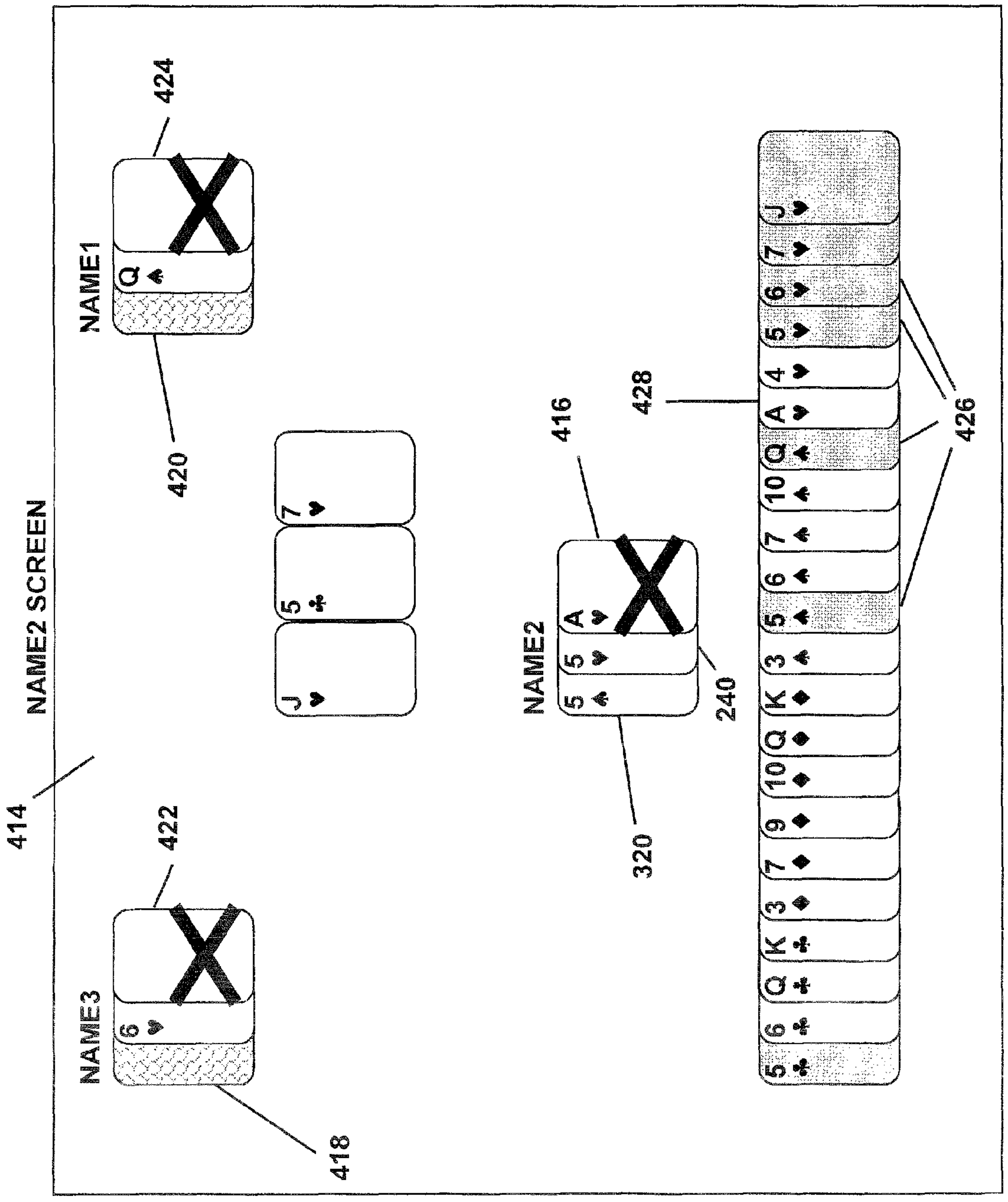
FIG. 2H shows the second player's screen, for the same game as FIG. 2A, after 3 card selection rounds have been completed.
Figure 2I:
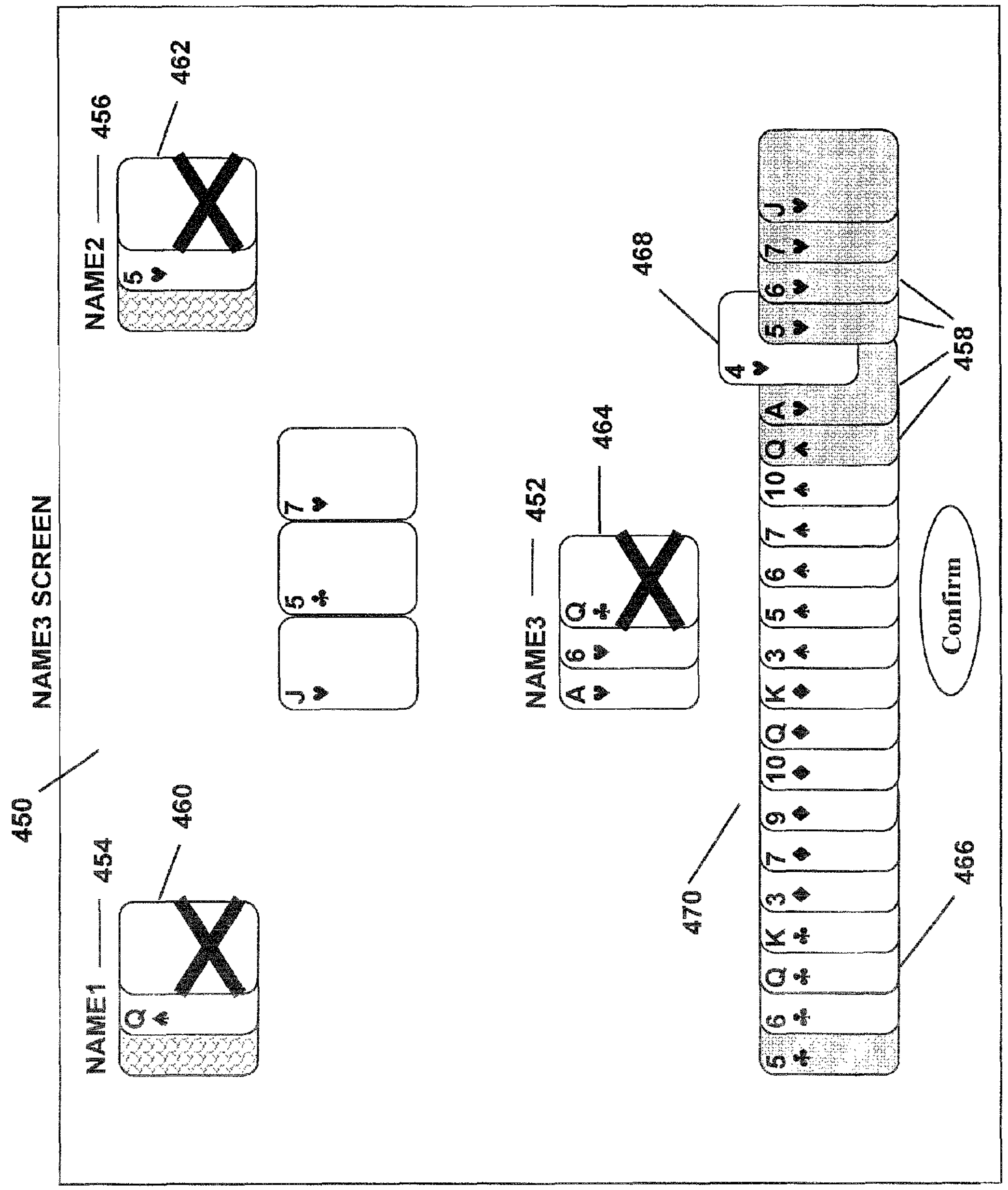
FIG. 2I shows a third player's screen, for the same game as FIG. 2A, on the fourth card selection round, when a possible card choice has been indicated but not confirmed.
Figure 2J:
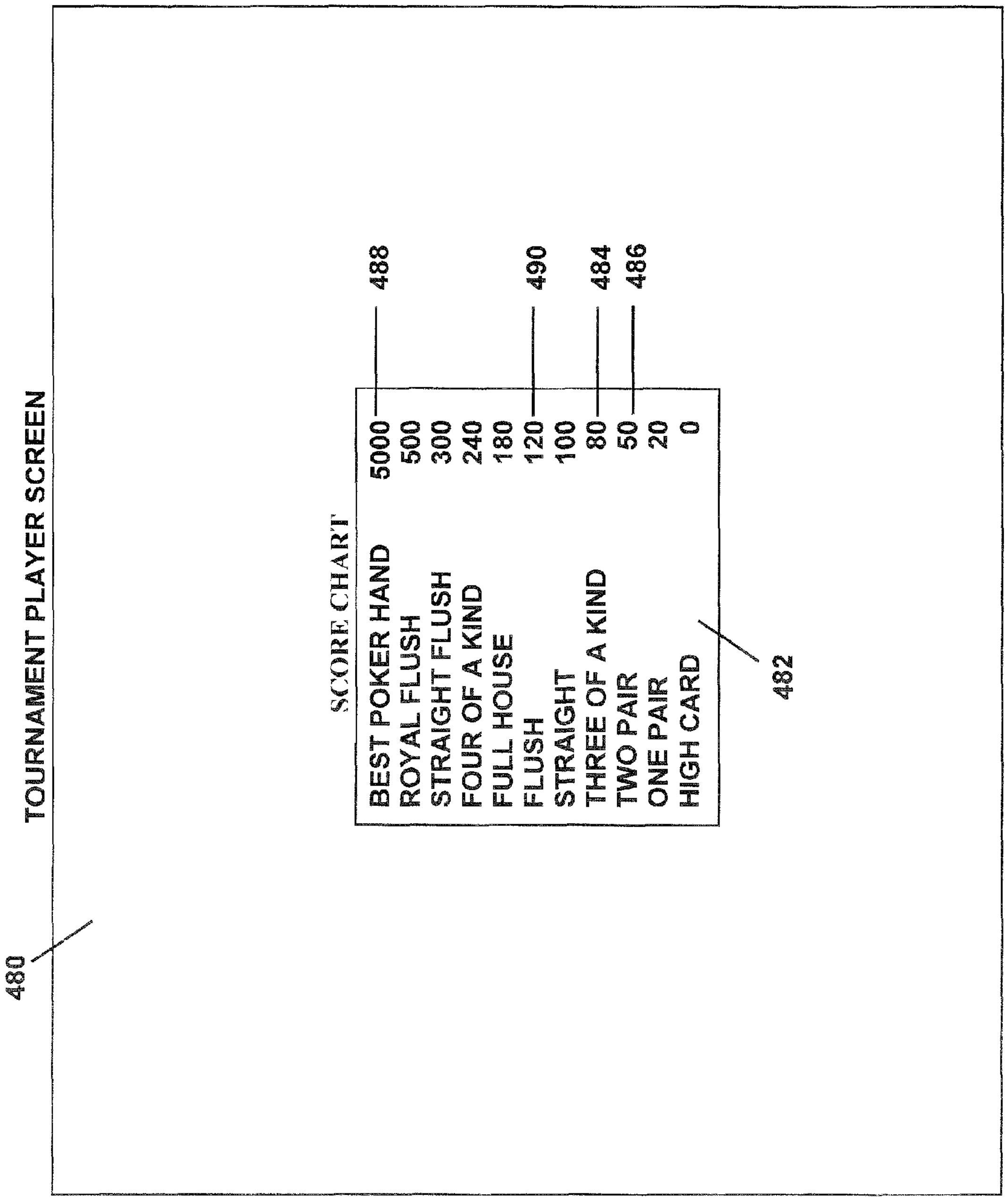
FIG. 2J shows a player's screen displaying a tournament scoring chart.
Figure 2K:
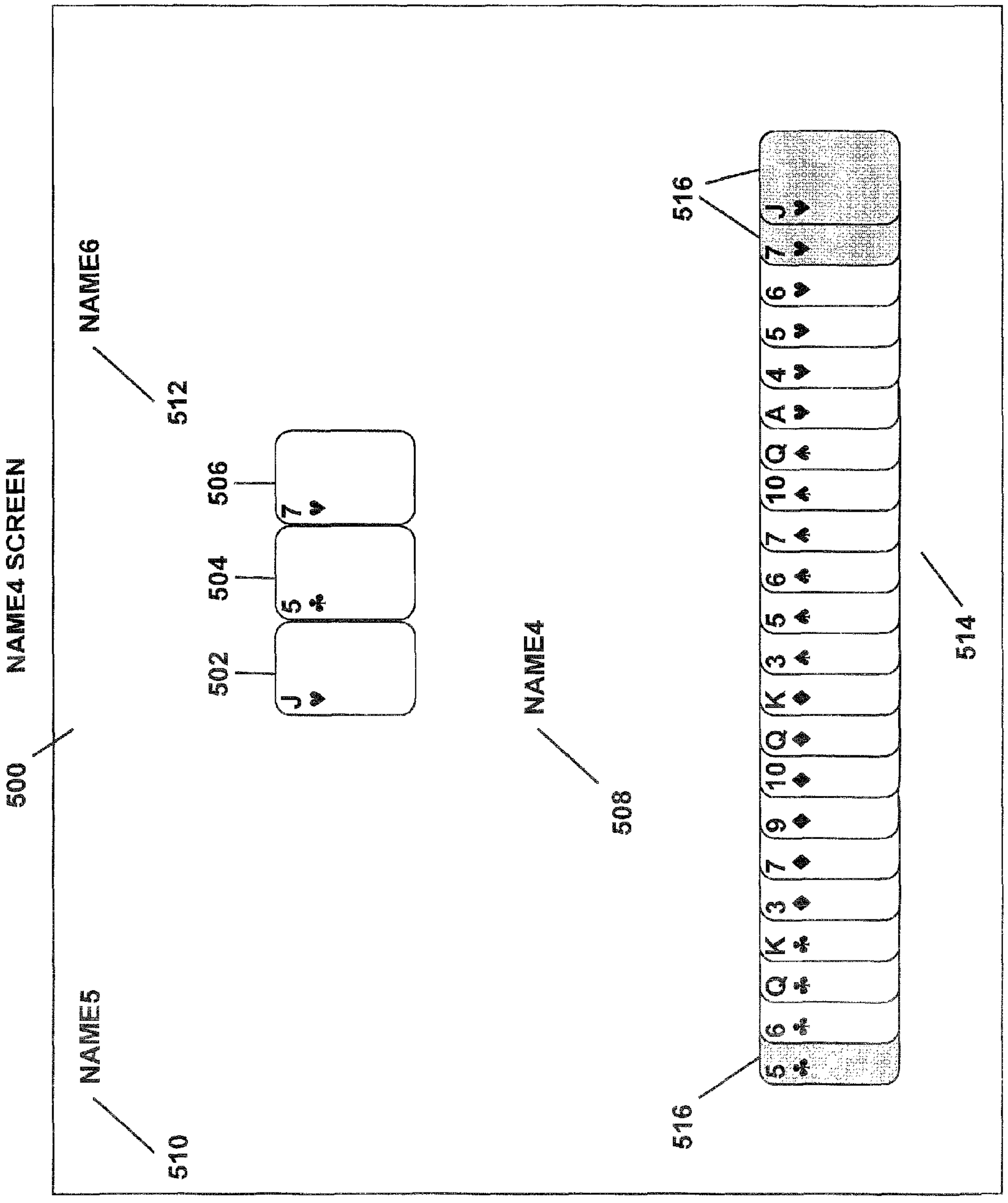
FIG. 2K shows a second real player's screen in the first game of a 2-player tournament, where 2 real players indirectly play against each other, and each play directly against 2 virtual players, after 3 community cards are randomly dealt but before any of the 4 card-selection rounds have occurred.
Figure 2L:
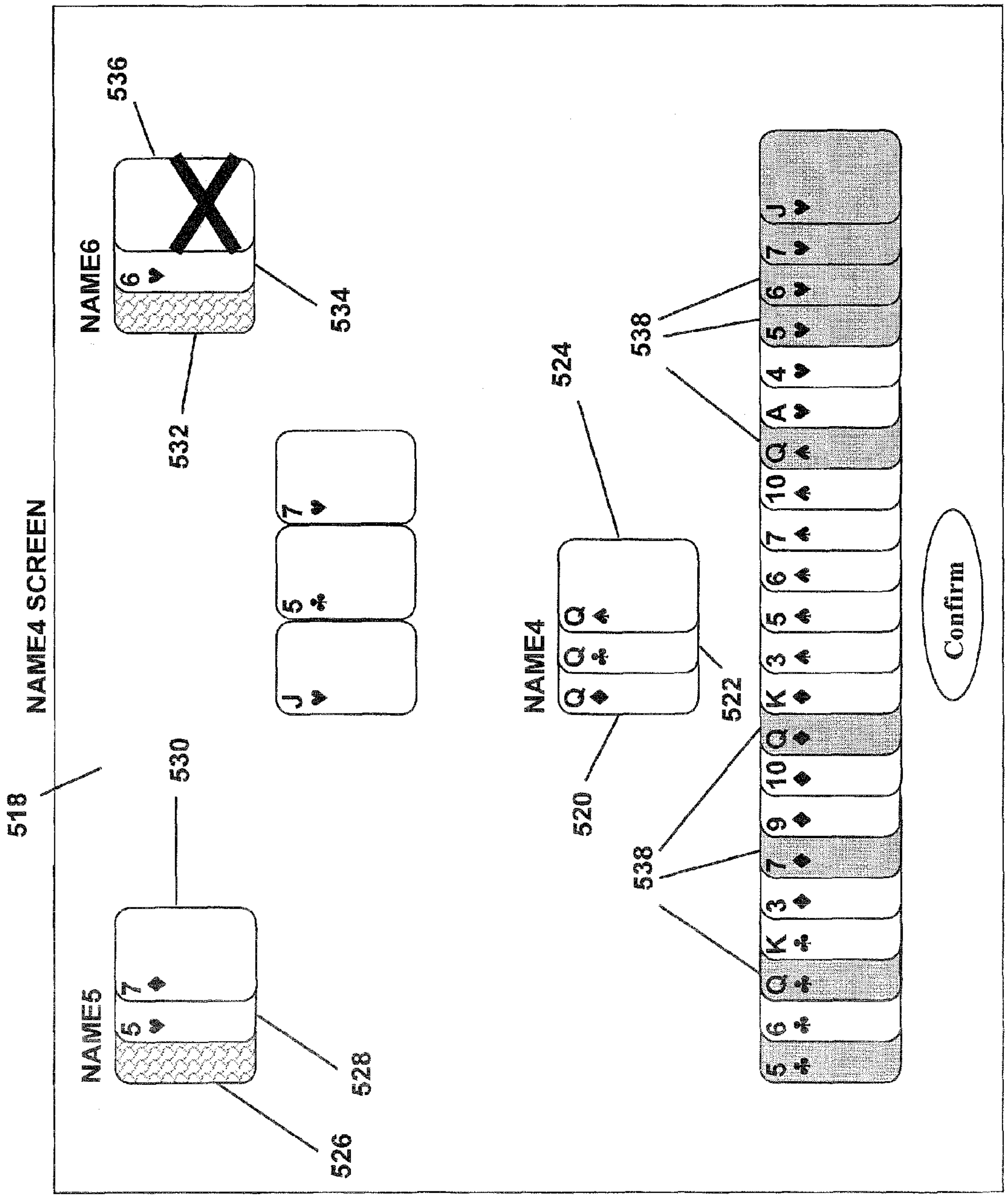
FIG. 2L shows the second real player's screen, for the same first tournament game as FIG. 2K, after 3 card selection rounds have been completed.
Figure 2M:
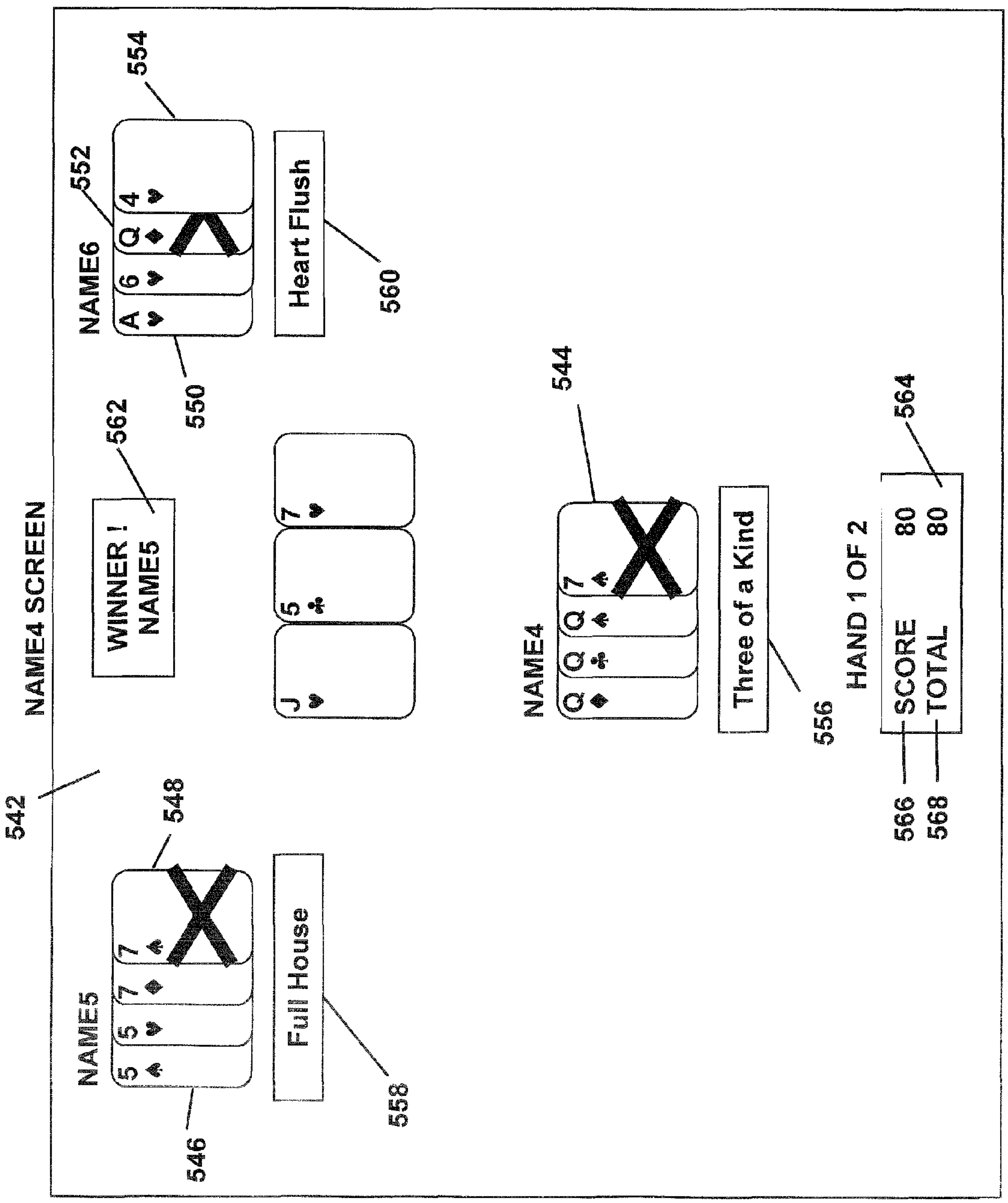
FIG. 2M shows the second real player's screen, for the same game as FIG. 2K, after the first tournament game has been completed.
Figure 2N:
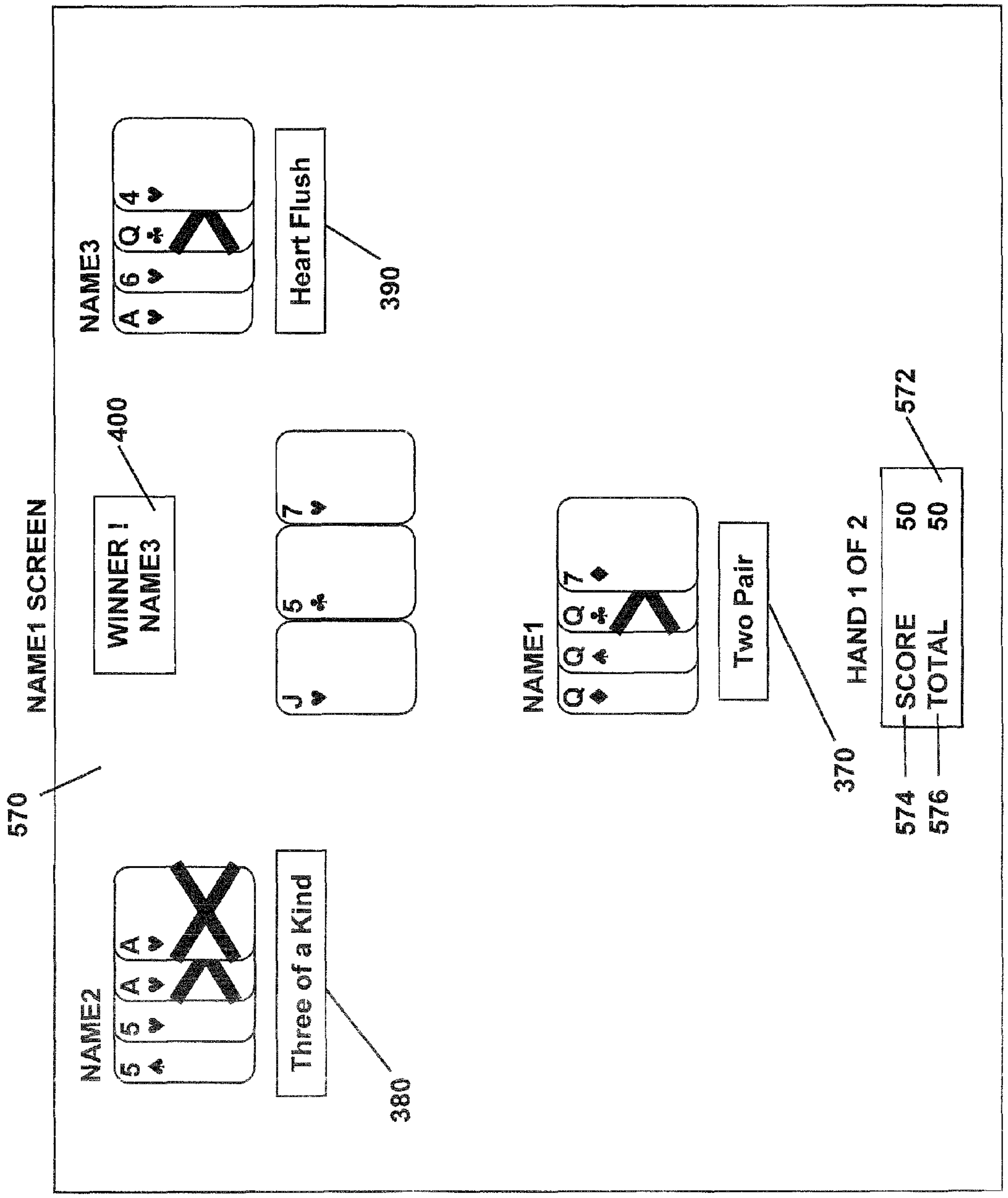
FIG. 2N shows the first real player's screen, for the same game as FIG. 2K, after the first tournament game has been completed.
Figure 2O:
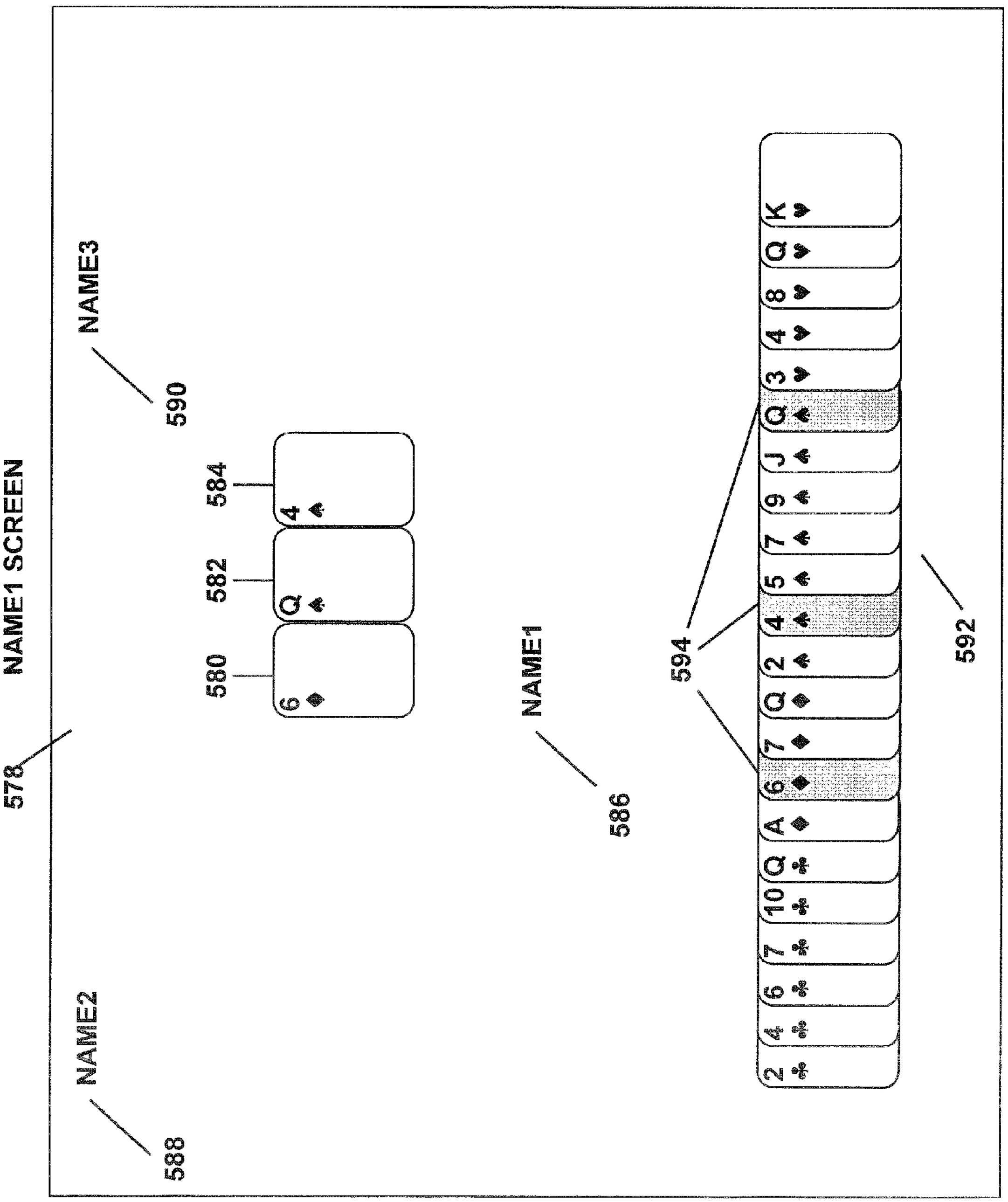
FIG. 2O shows the first real player's screen, for the second tournament game, after 3 community cards have been dealt, but before players have selected any cards.
Figure 2P:
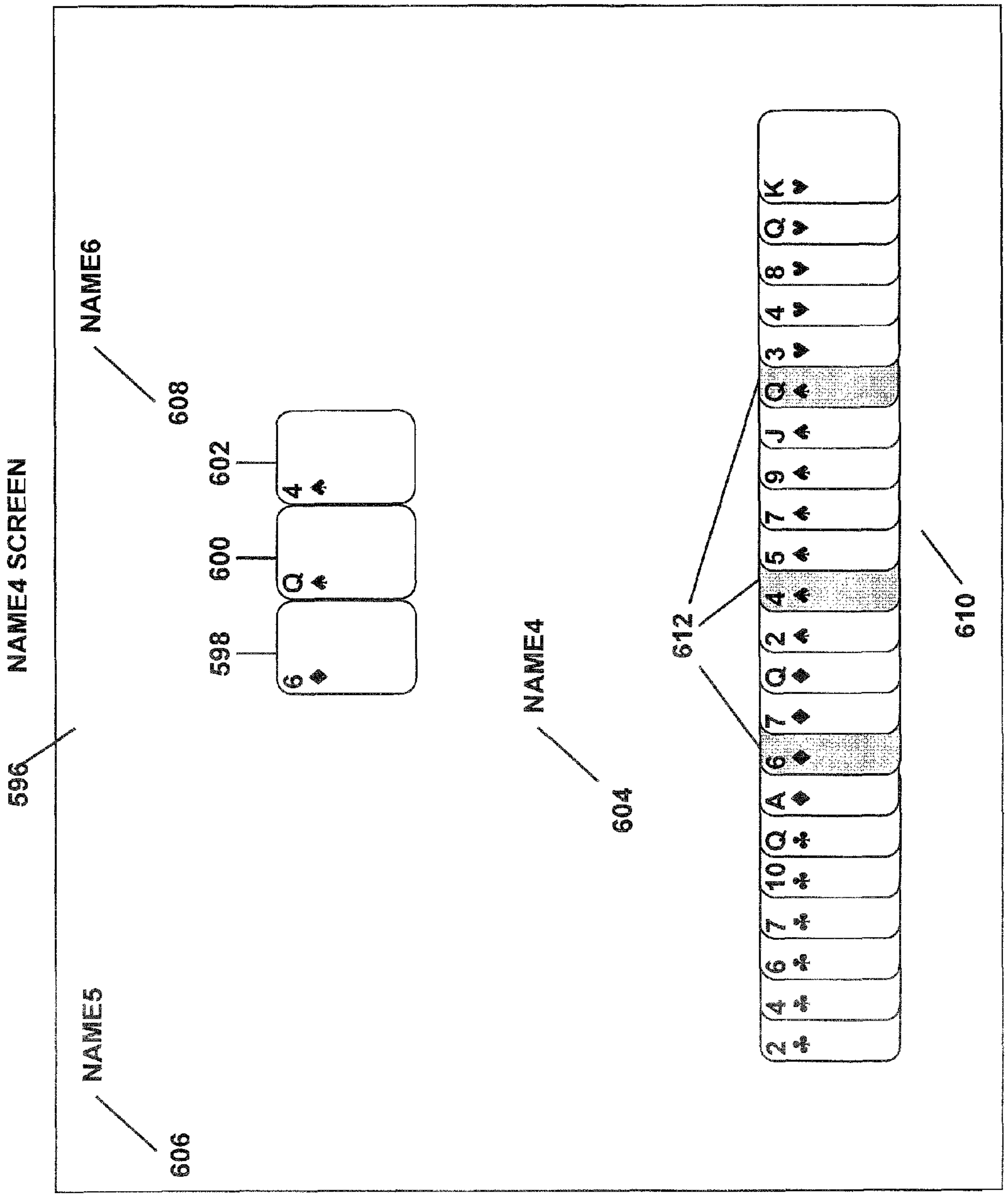
FIG. 2P shows the second real player's screen, for the same tournament game as FIG. 2O, after 3 community cards have been dealt, but before players have selected any cards.
Figure 2Q:
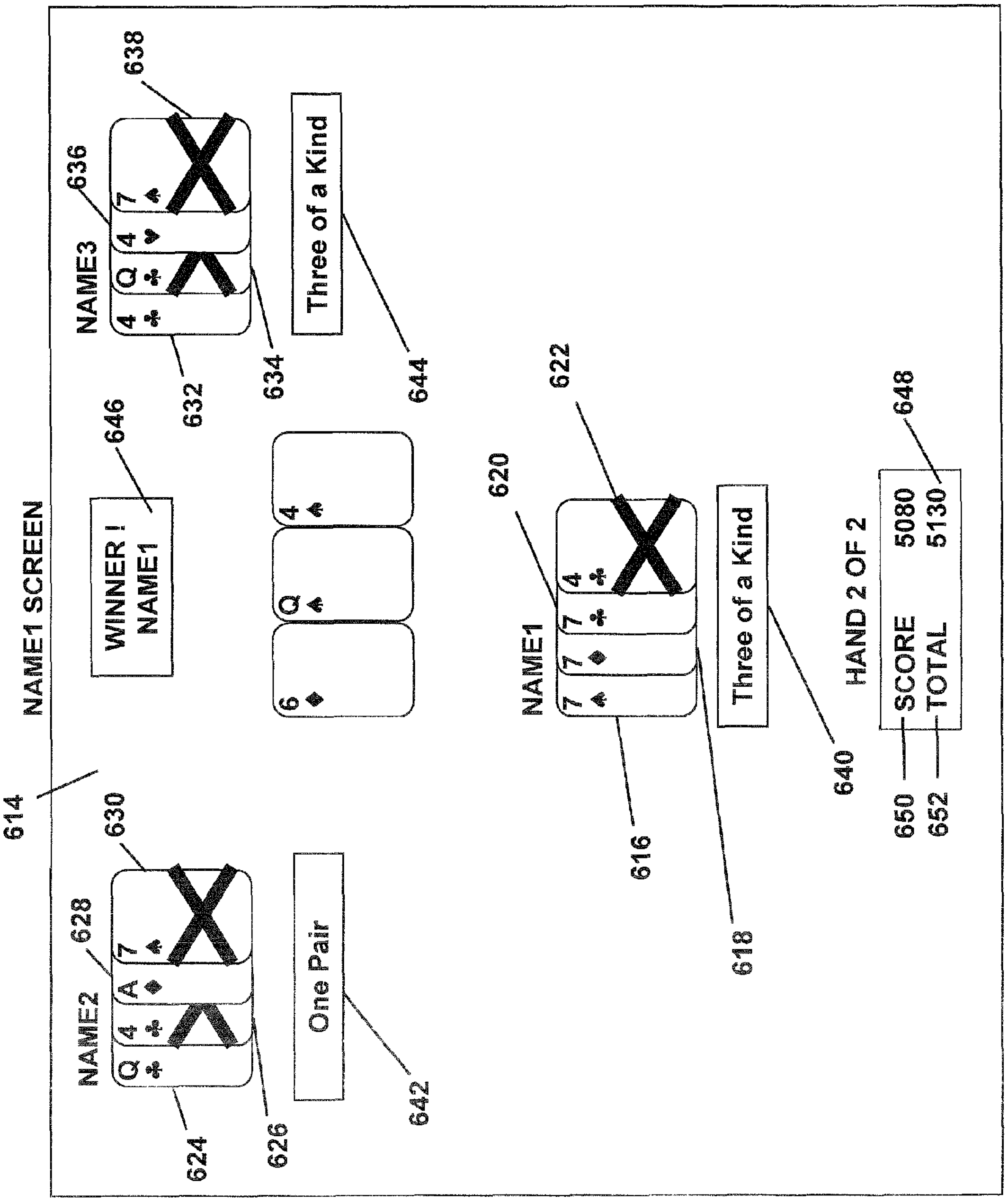
FIG. 2Q shows the first real player's screen, for the same tournament game as FIG. 2O, after it has been completed.
Figure 2R:
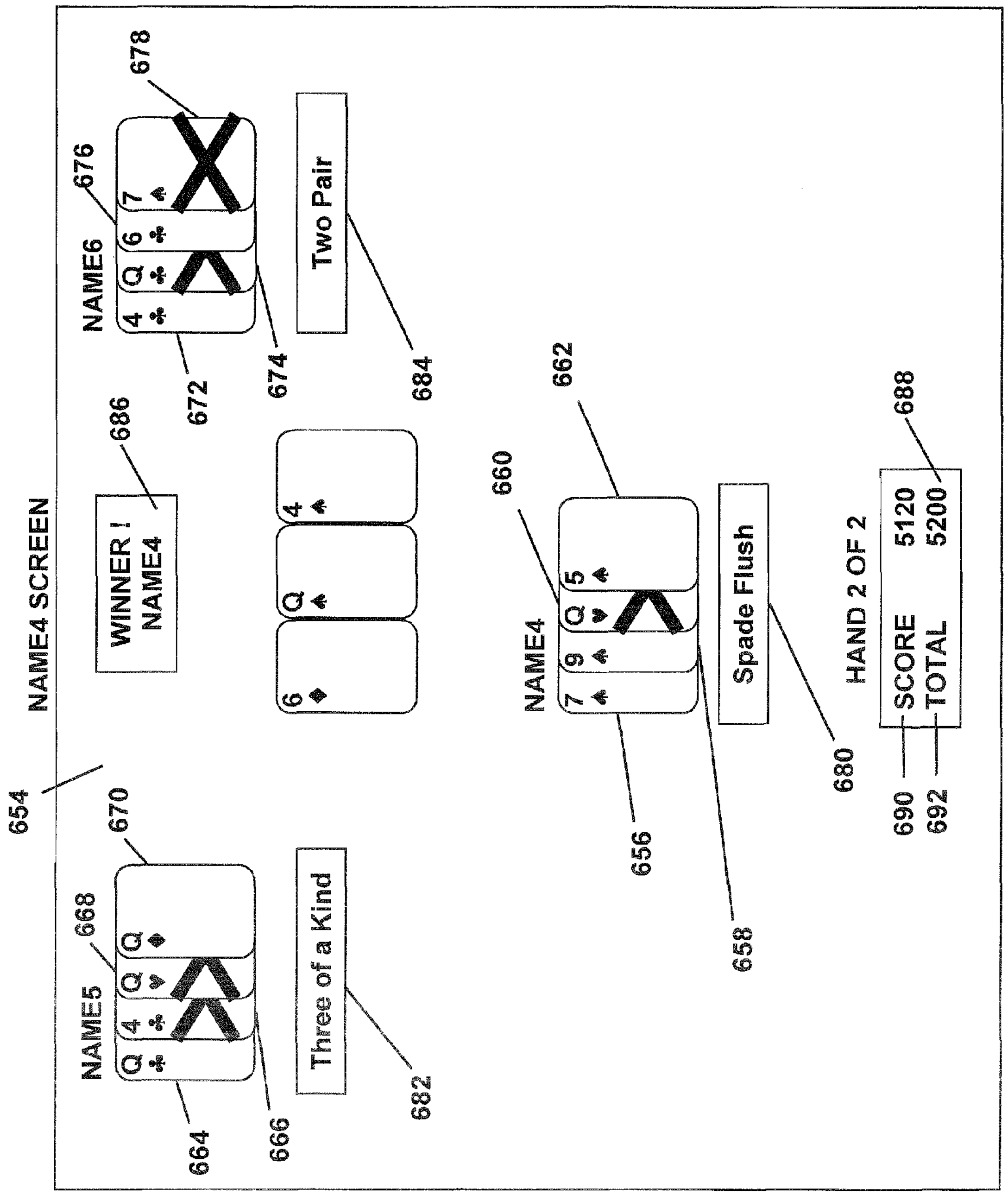
FIG. 2R shows the second real player's screen, for the same tournament game as FIG. 2O, after it has been completed.
Figure 2S:
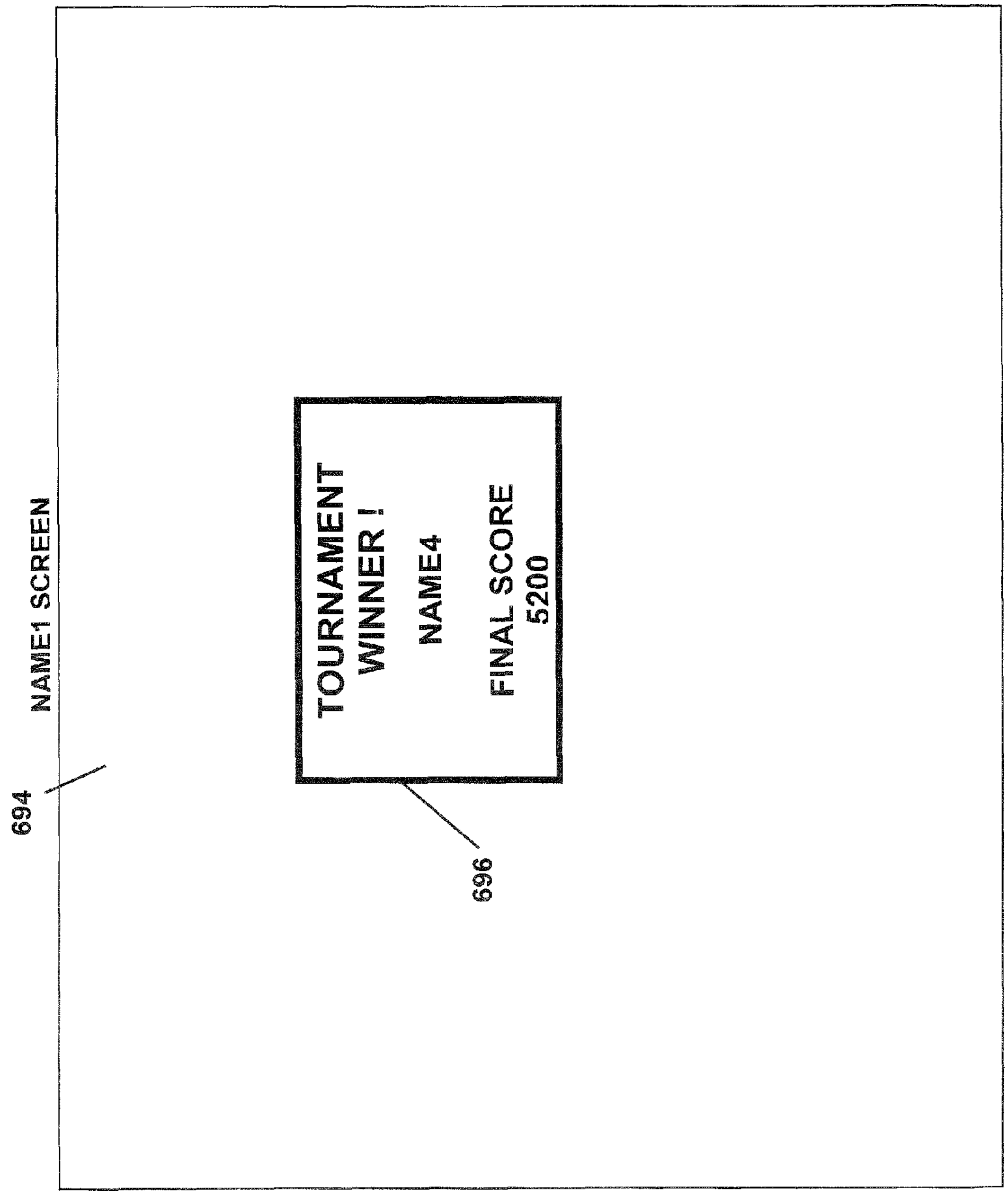
FIG. 2S shows the first real player's screen, for the winner of the tournament referenced in FIG. 2K.
Figure 2T:
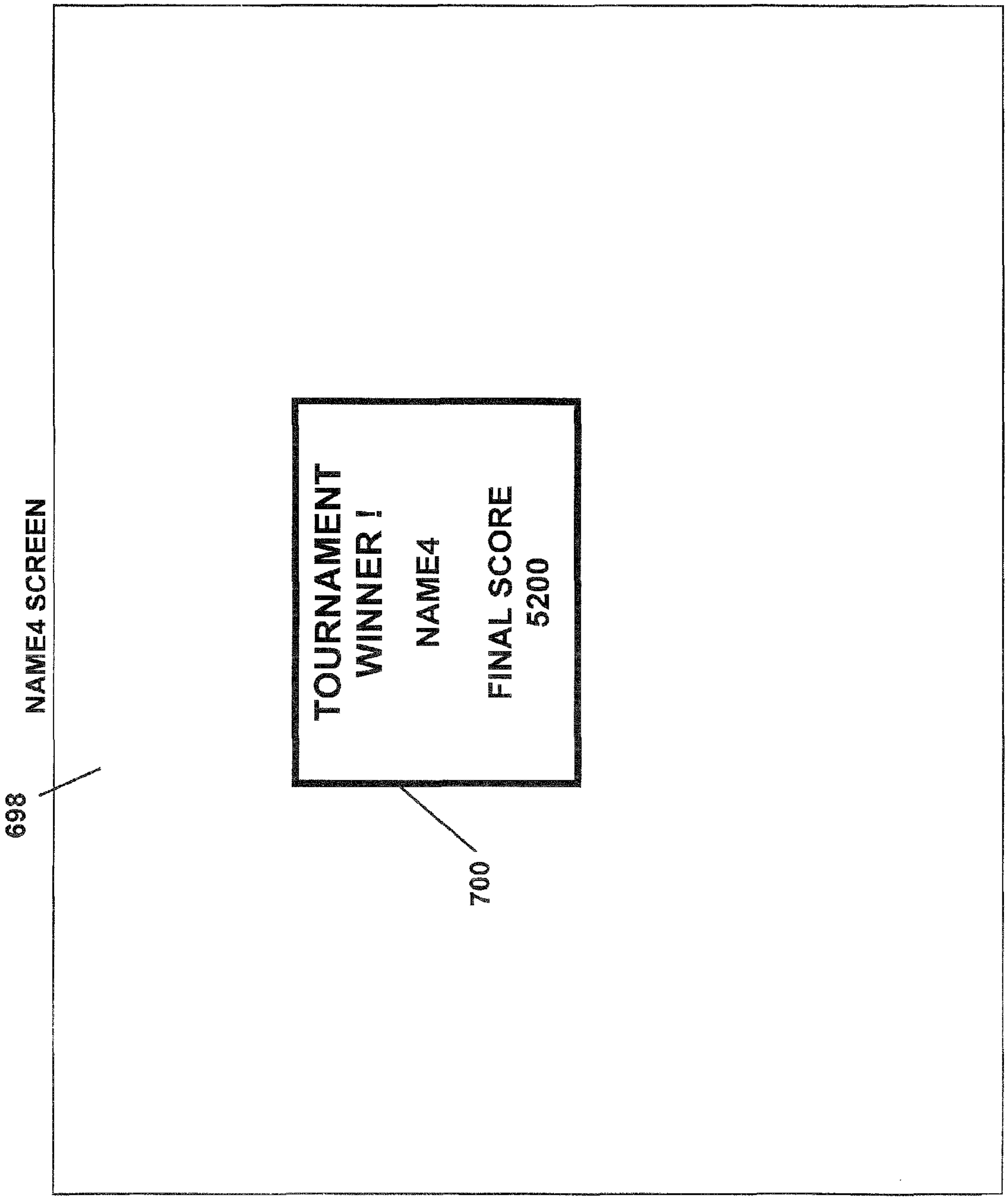
FIG. 2T shows the second real player's screen, for the winner of the tournament referenced in FIG. 2K.

FIGS. 2A-T are divided into 3 subsets. The first subset FIGS. 2A-F, when considered by itself, represents a single actual player NAME1 playing against 2 virtual players NAME2 and NAME3 on a single computing device, with a display screen and a mouse for card or bet selection. FIG. 2A shows NAME1's screen 90 after the 3 community cards, heart jack 100, club five 110, heart seven 120, usable by all players in forming a hand, have been dealt face up, but before any of the players, NAME1 130, NAME2 140 or NAME3 150 have selected their first card from the same second deck 160, that also displays the community cards. The community cards in the selection deck 170 are shadowed-out to indicate that they cannot be selected. On each actual player's screen, cards in the card selection deck, that that player knows cannot be subsequently selected and dealt, are shadowed-out.

FIG. 2B shows NAME1's screen 172 after NAME1 has clicked on the diamond queen 180 using a mouse. A single-click causes the software to offset the diamond queen 180 to indicate that it is NAME1's current tentative choice. NAME1 will click on the "Confirm" button 190 to activate the current tentative card selection. Alternatively, double-clicking on a card using the mouse commits a player to that card as his/her choice, circumventing the need to then click on the "Confirm" button. Note that no cards have been dealt yet since all the players haven't completed their card selection.

FIG. 2C shows NAME1's screen 192 after all the players have privately selected and then been dealt their first card. Since cards are dealt face down in card selection round one, only NAME1's first dealt card 200, the diamond queen is displayed on NAME1's screen and both NAME2's first dealt card 208 and NAME3's first dealt card 210 are dealt face down. The diamond queen 220 is shadowed-out in the displayed card selection deck to indicate that NAME1 can no longer select it to be dealt.

FIG. 2D shows NAME1's screen 222 after all the players have privately selected and then been dealt their second card. NAME1 selected and was dealt the spade queen 230, NAME2 selected and was dealt the heart five 240, and NAME3 selected and was dealt the heart six 250. No player in this round was blocked. Now in NAME1's card selection deck the spade queen, heart five and heart six are all shadowed-out 260, because NAME1 knows these cards have already been dealt.

FIG. 2E shows NAME1's screen 262 after all the players have privately selected and then been dealt their third card. NAME1 selected the club queen, but was blocked and therefore dealt a null card 270. In fact all 3 players were blocked, with both NAME2 and NAME3 also being dealt null cards. Note that while NAME1's screen shows the rank and suit of the selected card associated with his/her dealt card 270, it does not display the rank and suit associated with either NAME2's dealt null card 280 or NAME3's dealt null card 290. Note that in the card selection deck, the club queen 300 is not shadowed-out because even though NAME1 had selected it, to NAME1 it still might not have been dealt.

FIG. 2F shows NAME1's screen 302 when the hand has been completed. It displays every card selected by and dealt to every player on every card selection round, regardless of whether the card was dealt face down or dealt face up and blocked. NAME1 was dealt his/her fourth card selection, the diamond seven 310. NAME1 now sees that NAME2 was dealt the spade five 320 as his/her first card, and selected the heart ace in both the third and fourth selection rounds 330. Note that NAME2 was able to select the heart ace twice. This is so because in each round NAME2 did not know whether or not the heart ace had been dealt on a previous round. However, as it turns out in both of these card selection rounds, NAME2 was dealt a null card 330 since NAME3 had already been dealt the heart ace as his/her first card 340. NAME1 now also sees that NAME3 selected the club queen 350 in the third card selection round, to successfully block NAME1 from getting three queens. This prevented NAME1 from eventually getting a full house to win the hand. NAME3 was dealt the heart four 360 in the fourth selection round to successfully complete a heart flush. The final results show that a) NAME1 got Two Pair 370 with 2 queens and 2 sevens using the community heart seven 120, b) NAME2 got Three of a Kind 380 with 3 fives using the community club five 110 and c) NAME3 got a Heart Flush 390 using the community heart jack 100 and heart seven 120. Therefore, NAME3 was the winner 400 with the best poker hand.

The second subset, FIGS. 2G-I taken together with the first subset FIGS. 2A-F, represents 3 actual players, NAME1, NAME2 and NAME 3, playing directly against each other. Each actual player uses a separate computing device, with a display screen and a mouse for card or bet selection. The computing devices are linked together in a client-server or peer-to-peer operating environment with play under the control of game management software. FIGS. 2G-H show NAME2's screen for this example when NAME2 is an actual player. FIG. 2G shows NAME2's screen 404 after the 3 community cards, heart jack 100, club five 110, heart seven 120, usable by all players, have been dealt face up, but before any of the players, NAME2 406, NAME3 408 or NAME1 410 have been dealt their first card. It also shows that NAME2 has clicked on the spade five 412 using a mouse. The software offsets the spade five 412 in the card selection deck to indicate it is NAME2's current tentative choice. NAME2 will click on the "Confirm" button 190 to activate the current tentative card selection. NAME2 chooses from the same card selection deck 160 used by both NAME1 and NAME3, with the same community cards shadowed-out 170. Note that the players' positions on NAME2's screen are different than they are on NAME1's screen, with NAME2 406 now appearing below the community cards.

FIG. 2H shows NAME2's screen 414 after all the players have privately selected and then been dealt their third card. NAME2's first 2 dealt cards were the spade five 320 and the heart five 240. However, NAME2 was blocked on his/her third card selection, the heart ace 416. NAME2 possibly chose the heart ace to block NAME3 from getting a heart flush. Since cards were dealt face down in card selection round one, the first card dealt to NAME3 was dealt face down 418, and so was the first card dealt to NAME1 420. The third card dealt to NAME3 was a null card 422 and so was the third card 424 dealt to NAME1. This might have led NAME2 to think that either NAME3 or NAME1, or both, also selected the heart ace for his/her third card. Note that on NAME2's screen, null cards dealt face up to the other players do not display the rank and suit of their associated selected card until the hand is completed. The additional cards shadowed-out in the card selection deck 426 are now the spade five, heart five, heart six and spade queen, since NAME2 now knows these cards have already been dealt. However, the heart ace 428 is not shadowed-out in the card selection deck. The heart ace might have not been dealt in a previous round and since NAME3's third dealt card was a null card 424, NAME3 could have also selected the heart ace in the third round. Therefore, from NAME2's perspective, the heart ace might not have been dealt yet, in which case it would still available for selection. Referring back to FIG. 2F we see that NAME3 had been dealt the heart ace as his/her first card 340, but NAME2 didn't know that in the third card selection round. Also, in FIG. 2F we see that NAME2 selected the heart ace as his/her fourth card 340 in a vain attempt to stop NAME3 from getting an ace high heart flush.

FIG. 2I shows NAME3's screen 450 at the start of the fourth card selection round when NAME3 is an actual player. Note the screen positions of NAME3 452, NAME1 454 and NAME2 456. The additional cards shadowed-out 458 in the card selection deck are the heart ace, heart six, spade queen and heart five, since NAME3 knows these cards have already been dealt. NAME1's third dealt card was a null card 460, and so was NAME2's third dealt card 462. NAME3 was also dealt a null card 464 in the third card selection round, when he/she selected the club queen. Note that the club queen is not shadowed-out 466 in the card selection deck, to indicate that NAME3 could still select it on this round. At the start of the fourth card selection round, NAME3 doesn't know if the club queen has been dealt yet. It might not have been dealt in the first card selection round, and was selected by NAME1 as his/her third card 460 or by NAME2 as his/her third card 462, or by both. The heart four 468 is offset in the card selection deck 470 as NAME3's tentative fourth card selection.

FIGS. 2J-T is a third subset of player screen drawings that taken together with FIGS. 2A-F represents 2 actual players, NAME1 and NAME4 indirectly playing against each other in a tournament consisting of 2 hands.

FIG. 2J shows a TOURNAMENT PLAYER'S screen 480 at the start of the tournament, that displays the Score Chart 482 used to determine the score each actual player receives on each hand played. The tournament winner is the actual player with the highest total score of all active, actual players at the end of the tournament Each actual player uses a separate computing device, with a display screen and a mouse for card or bet selection, to play directly against 2 virtual players on his/her computing device. The computing devices are linked together in a client-server or peer-to-peer operating environment, with play under the control of game management software. NAME1 is playing against virtual players NAME2 and NAME3, and NAME4 is playing against virtual players NAME5 and NAME6. When the 2 actual players NAME1 and NAME4 have either selected the same sequence of cards for all previous rounds of card selection, or have selected no cards previously, then game management software insures that each set of corresponding active, virtual players select the same card in rank and suit for the current round, to maintain a level playing field. In this example NAME2 and NAME5 are corresponding virtual players, and so are NAME3 and NAME6.

FIG. 2K shows NAME4's screen 500 after the 3 community cards, heart jack 502, club five 504, heart seven 506, usable by all players, have been dealt face up, but before any of the players, NAME4 508, NAME5 510, NAME3 512 have selected their first card from the same second deck 514, that also displays the same community cards. The community cards in the card selection deck are shadowed-out 516 to indicate that they cannot be selected. On each actual player's screen, cards that can no longer be selected by that player are shadowed-out in the card selection deck. Note that game management software insures that FIG. 2K and FIG. 2A contain the same community cards and the same information except for the names.

FIG. 2L shows NAME4's screen 518 after all the players on NAME4's computing device have privately selected and then been dealt their third card. In the first card selection round, NAME4 selected and was dealt the diamond queen 520, the same card that NAME1 selected and was dealt 200.

NAME5's first card 526 and NAME6's first card 532 were dealt face down. However, those cards should be the same as the first cards dealt to their corresponding virtual players NAME2 and NAME3 on NAME1's computing device. Looking ahead, FIG. 2M shows this to be true. In addition, since NAME4 and NAME1 selected the same first card, NAME5's second dealt card 528, the heart five, is the same as its corresponding virtual player, NAME2's second dealt card 240 on NAME1's computing device. Similarly, NAME6's second dealt card 534, the heart six is the same as its corresponding virtual player, NAME3's second dealt card 250 on NAME1's computing device.

In the second card selection round, the actual players NAME4 and NAME1 chose different second cards. NAME4 selected and was dealt the club queen 522, whereas NAME1 selected and was dealt the spade queen 230. Therefore, starting in round three, game management software no longer insures that NAME1's and NAME4's corresponding virtual players choose the same cards. Note that as his/her third card, NAME5 chose and was dealt the diamond seven 530, whereas NAME5's corresponding virtual player NAME2 was dealt a null card 280 as his/her third card. Now NAME6 was dealt a null card 536 in card selection round three and so was its corresponding virtual player NAME3 290. However, at this stage they could have selected different cards, each of which was blocked. NAME4 selected and was dealt the spade queen 524 in card selection round three, whereas, NAME1 selected the club queen and also was blocked 270. The additional cards shadowed-out 538 in the card selection deck are the club queen, diamond seven, diamond queen, spade queen, heart five and heart six, since NAME4 knows these cards have already been dealt.

FIG. 2M shows NAME4's screen 542 on completion of the first of 2 tournament hands played on his/her computing device. It shows that in the first card selection round NAME5 was dealt the spade five 546, and his/her corresponding virtual player NAME2 was also dealt the spade five 320. Similarly, in the first card selection round, NAME6 was dealt the heart ace 550, and his/her corresponding virtual player NAME3 was also dealt the heart ace 340. We also see that by selecting the spade seven 548 as his/her fourth card, NAME5 blocked NAME4 from being dealt the spade seven 544, to prevent NAME4 from getting a full house. NAME6 was dealt the heart four 554 as his/her fourth card, and so was his/her corresponding virtual player NAME3 dealt the heart four 360 as his/her fourth card. In this instance NAME6 got a heart flush 560 and his/her corresponding virtual player NAME3 got the same heart flush 360, even though the cards they selected in card selection round three were different; NAME6 selected the diamond queen 552, whereas NAME3 selected the club queen 350. On the completion of the hand, NAME4 has Three of a Kind 556, NAME5 has a Full House 558 and NAME6 has a Heart Flush. Therefore, on the game played on NAME4's computing device, NAME5 was the winner 562 with the best poker hand 558. Since this is a tournament where the actual players, NAME1 and NAME4 are indirectly competing against each other, each receives a score for each hand played, regardless of whether or not he/she had the best poker hand. NAME4's scoring data on completion of the first hand 564 shows that NAME4 received 80 points 566 for Three of a Kind 556 based on the Score Chart 484. NAME4 has a total score of 80 points 568 on completion of hand 1.

FIG. 2N shows NAME1's screen 570 on completion of the first of 2 tournament hands. NAME1 has Two Pair 370, NAME2 has Three of a Kind 380 and NAME3 has a Heart Flush 390. Therefore, on the game played on NAME1's computing device, NAME3 was the winner 400 with the best poker hand 390. In neither game did the actual player have the best poker hand. However, what matters in this tournament is which actual player, NAME1 or NAME4 ends up with the highest total score. NAME1's scoring data on completion of the first hand 572 shows that NAME1 received 50 points 574 for Two Pair 370 in the current hand based on the Score Chart 486. NAME1 has a total score of 50 points 576 on completion of hand 1. At the end of the first hand NAME4 is ahead of NAME1 by 30 points.

Game management software now checks to see if the tournament is over. Since there is one more hand to be played, the second hand commences for both NAME1 and NAME4. FIG. 2O shows NAME1's screen 578 at the start of hand 2 with players NAME1 586, NAME2 588 and NAME3 590, and after the community cards, diamond six 580, spade queen 582 and spade four 584 have been randomly dealt, and after the card selection deck has been randomly generated and displayed 592, with the community cards shadowed-out 594. Note that the composition of the card selection deck for this hand 592 is different than that of the first hand 160, and so are the community cards.

Similarly, FIG. 2P shows NAME4's screen 596 at the start of hand 2 with players NAME4 604, NAME5 606 and NAME6 606, and after the community cards, diamond six 598, spade queen 600 and spade four 602 have been randomly dealt, and after the card selection deck has been displayed 610, with the community cards shadowed-out 612. As expected, NAME4's computing device displays the same community cards and card selection deck as does NAME1's computing device.

FIG. 2Q shows NAME1's screen 614 on completion of hand 2. NAME1 got Three of a Kind 640, NAME2 got One Pair 642 and NAME3 also got Three of a Kind 644. However, since NAME1 got the higher Three of a Kind, NAME1 was the winner 646 with the best poker hand on his/her computing device. NAME1's scoring data 648 for hand 2 shows that NAME1 received 5080 points 650, 5000 points for winning 488 and 80 points for Three of a Kind 484. NAME1's total score at the end of 2 hands is now 5130 points 652.

FIG. 2R shows NAME4's screen 654 on completion of hand 2. NAME4 got a Spade Flush 680, NAME5 got Three of a Kind 682 and NAME6 got Two Pair 684. NAME4 was the winner 686 with the best poker hand on his/her computing device. NAME4's scoring data 688 for hand 2 shows that NAME4 received 5120 points 690, 5000 points for winning 488 and 120 points for a Flush 490. NAME1's total score at the end of 2 hands is now 5200 points 692.

Comparing the cards dealt on NAME1's screen 614 to those dealt on NAME4's screen 654, we see that for the first card, NAME1 selected and was dealt the spade seven 616, and NAME4 also selected and was dealt the spade seven 656. Since the actual players had identical picks through the first card selection round, game management software insured that their corresponding virtual players card selection choices through round 2 also were identical. Thus NAME2's first dealt card was the club queen 624, and so was NAME5's first dealt card 664. NAME3's first dealt card was the club four 632, and so was NAME6's first dealt card 672. The corresponding virtual players second cards also matched up. NAME2 selected the club four and was blocked 626. NAME5 also selected the club four and was blocked 666. NAME3 selected the club queen and was blocked 634. NAME6 also selected the club queen and was blocked 674.

Now from the second card selection round on NAME1 and NAME4 make different card selections. NAME1's second card selection is the diamond seven 618, his/her third card selection is the club seven 620 and his/her fourth card selection is the club four that gets blocked 622. Whereas, NAME4's second card selection is the spade nine 658, his/her third card selection is the blocked heart queen 660 and his/her fourth card selection is the spade five 662, giving him a spade flush 680. Once the actual players make different card selections, game management software no longer insures that their corresponding virtual players make the same card selections. Thus we see that NAME2's third card selection is the diamond ace 628 and fourth card selection is the blocked spade seven 630, whereas corresponding virtual player NAME5's third card selection is the blocked heart queen 668 and fourth card selection is the diamond queen 670. Similarly, while NAME3's third card selection is the heart four 636, NAME6's third card selection is the club six 676. Coincidentally, their fourth card selection is the same, with NAME3 dealt a blocked spade seven 638 and NAME6 also dealt a blocked spade seven 678.

With the completion of the second hand on both NAME1's computing device and NAME4's computing device, the tournament is over. FIG. 2S shows NAME1's screen 694 at the end of the tournament and indicates that NAME4 was the tournament winner with a final high score of 5200 points 696. Similarly, FIG. 2T shows NAME4's screen 698 at the end of the tournament and also indicates that NAME4 with a final high score of 5200 points was the tournament winner 700, since NAME1's total score was 70 points less with 5130 points 652.

Set three (FIGS. 3A-G) shows 7 screen drawings of a card selection game with no community cards and 2 players. There are 6 rounds of player card selection with the first round dealt face down and the next five rounds dealt face up. In the first round, players select from a standard 52-card first deck of playing cards, and in rounds two thru six, from a smaller second deck of cards. The second deck contains both the cards selected in the first round and cards randomly selected from the first deck. The second deck of cards has fewer cards than does the first deck of cards. After each player has selected his/her card in a round, each player is dealt a card. This card is a no-value null card when a player selects a card that is the same as one selected by another player in the current round or in a previous round. Otherwise, the player is dealt his/her selected card. In this example the second deck contains 18 cards including the cards selected in the first round. The word "randomly" is used to represent a selection process where the results are unpredictable. The second deck is displayed face up on each actual player's screen. For this example, the size of the smaller second deck including the cards selected in the first round was set to a predetermined number of 18 cards. NAME1 is an actual player. The other player NAME2 could be either actual or virtual. Each actual player has a separate computing device, with a display screen and a mouse for making card or bet selections from the screen. On each actual player's screen, cards in the second deck of cards that can no longer be selected by that player are shadowed-out. Note that in these drawings a large X on a card indicates that it is a null card.

Figure 3A:
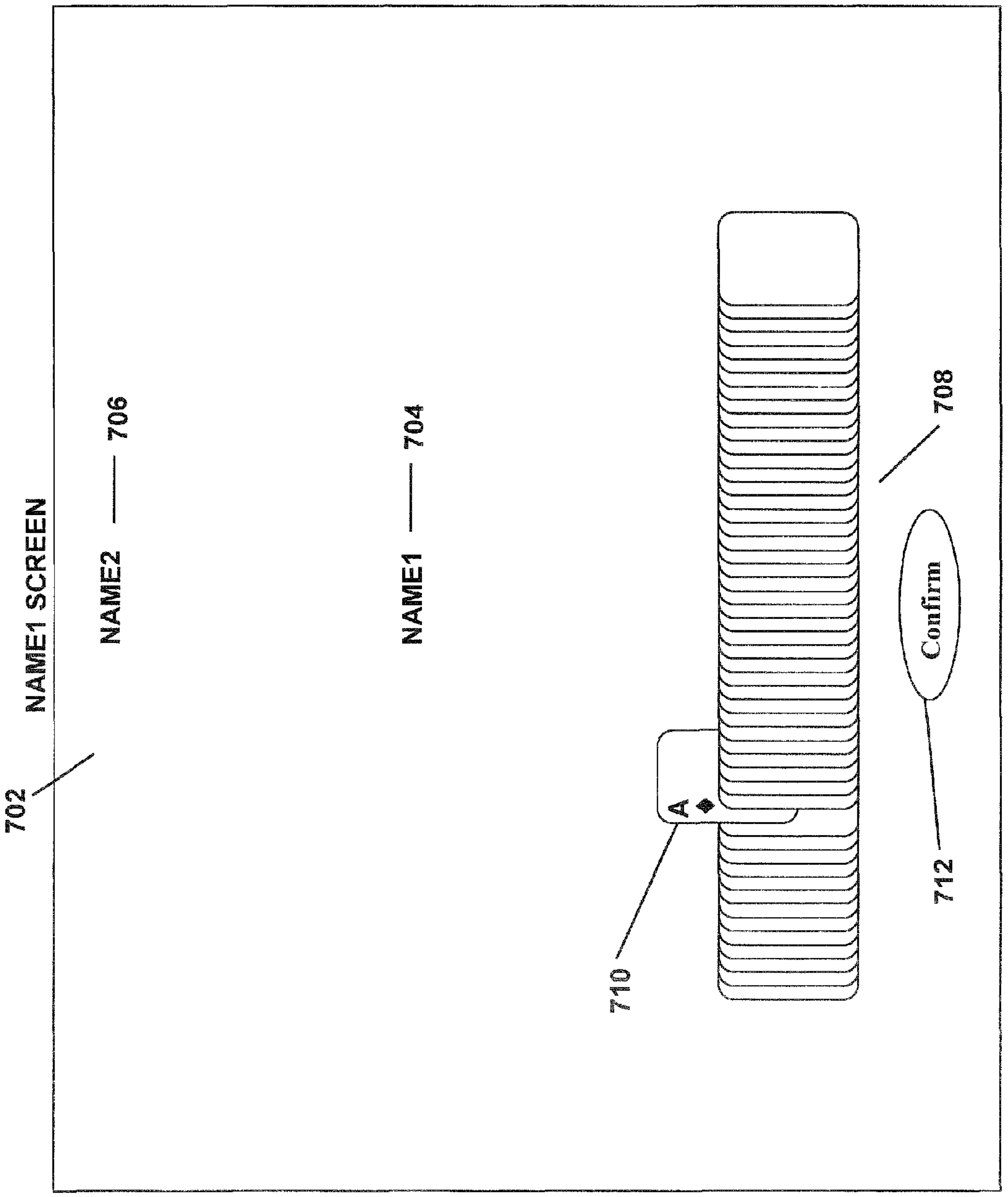
FIG. 3A shows a first player's screen in a 2-player game only involving 6 card-selection rounds, on the first card selection round using a first deck of cards, when a possible card choice has been indicated but not confirmed.

FIG. 3A shows NAME1's screen 702 before NAME1 704 and NAME2 706 have been dealt a card in round one, but after NAME1 has single-clicked on the diamond ace 710 using his/her mouse. A single-click causes the software to offset the diamond ace to indicate that it is NAME1's current tentative choice from the standard first deck of 52 playing cards displayed face up 708. NAME1 will click on the "Confirm" button 712 to activate the current tentative card selection. Alternatively, double-clicking on a card using the mouse commits a player to that card as his/her choice, circumventing the need to then click on the "Confirm" button.

Figure 3B:
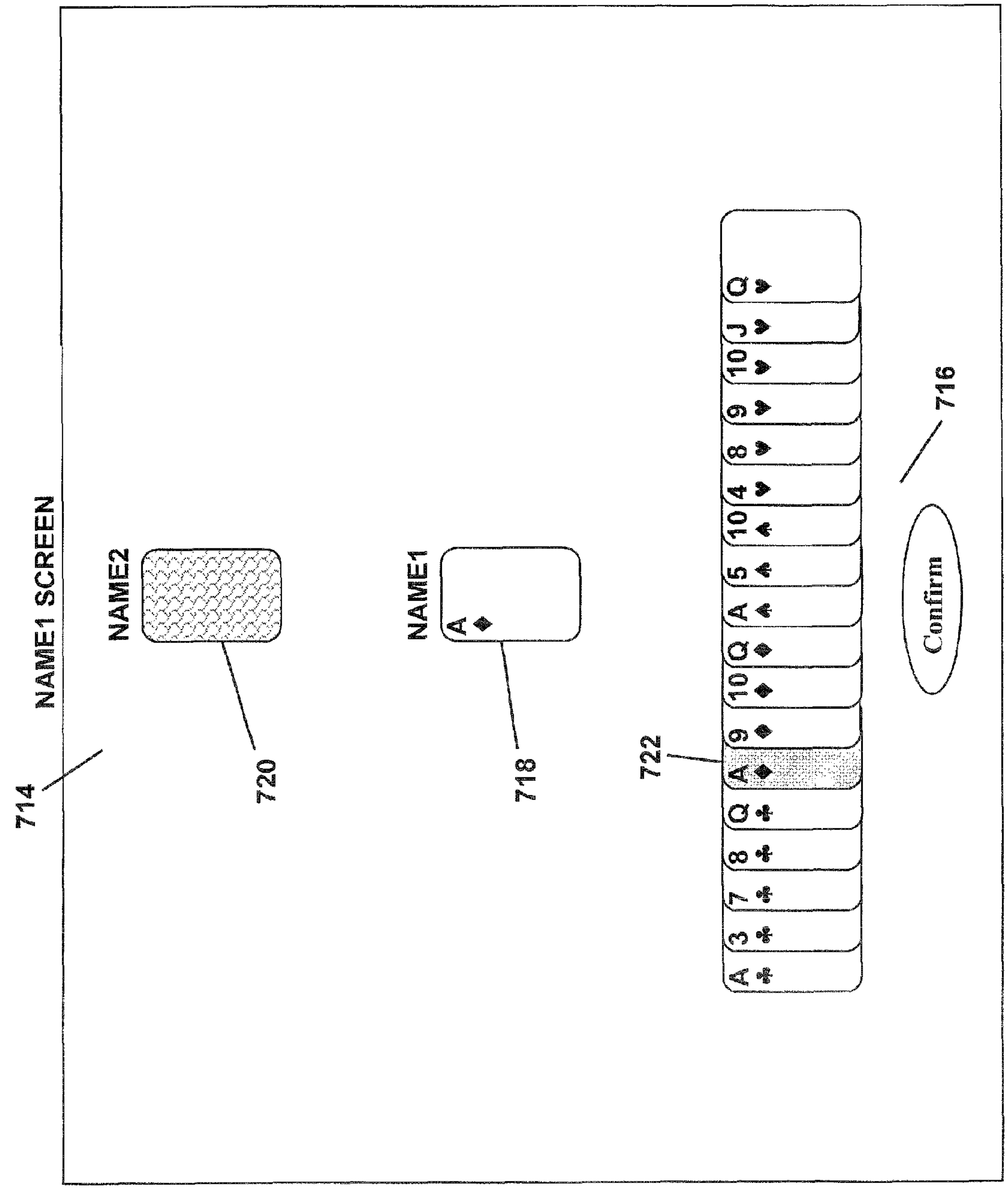
FIG. 3B shows the first player's screen, for the same game as FIG. 3A, at the start of the second card selection round, where, from the second card selection round on, players pick from a smaller second deck of cards.

FIG. 3B shows NAME1's screen 714 at the start of round two. The smaller second deck of cards containing a total of 18 cards based on a predetermined number is displayed face up 716. It is composed of the 2 cards selected on the first round and 16 cards randomly selected by the software from the first deck of cards. NAME1 selected and was dealt the diamond ace 718 in round one. NAME2 was dealt his/her round one card selection displayed face down 720 on NAME1's screen. NAME1 knows that NAME2 was not dealt a null card in round one, for then NAME1 would have had to have done the blocking, and also would have been dealt a null card in round one. Therefore, the second deck contains NAME2's first round card selection that NAME2 was dealt, but NAME1 doesn't know what card that is. Since the second deck contains a predetermined number of 18 cards, the software randomly selected 16 of them from the first deck of cards. The diamond ace is shadowed-out 722 in the second card selection deck, since NAME1 knows that it has already been selected.

Figure 3C:
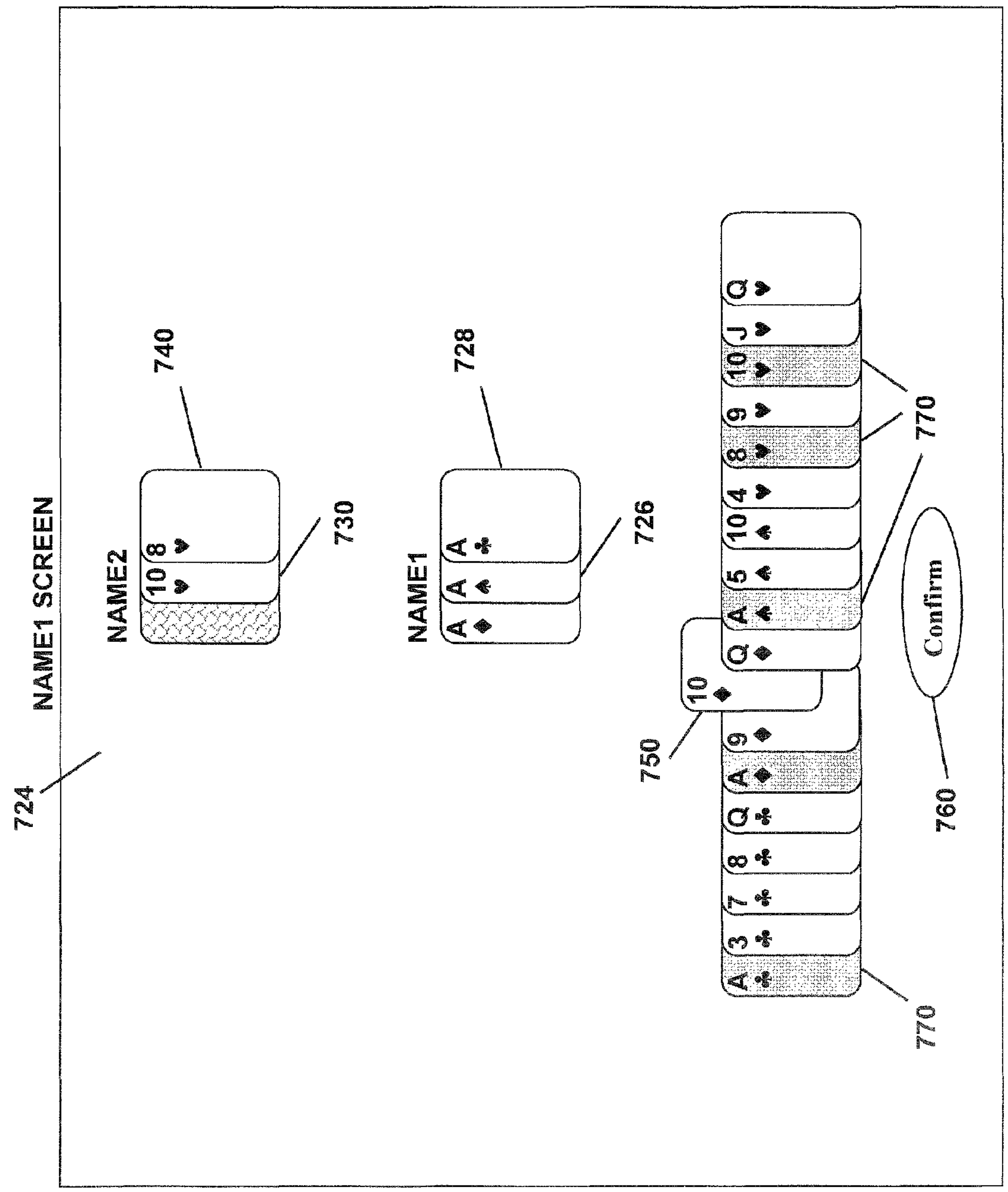
FIG. 3C shows the first player's screen, for the same game as FIG. 3A, at the start of the fourth card selection round, when a possible card choice has been indicated but not confirmed.

FIG. 3C shows NAME1's screen 724 prior to confirming his/her round four card selection. NAME1 selected and was dealt the spade ace 726 in round two and the club ace 728 in round three. NAME2 selected and was dealt the heart ten 730 in round two and the heart eight 740 in round three. NAME1's tentative round four card selection, now offset, is the diamond ten 750. To actually select the diamond ten, NAME1 will click the "Confirm" button 760. It appears that NAME1 is going for a full house, aces over tens. NAME1 can't get four aces since the heart ace is not in the card selection deck. NAME2 might be going for a queen high straight flush in hearts. The additional cards shadowed-out in the card selection deck 770 are now the club ace, spade ace, heart eight and heart ten, since NAME1 knows that these cards have already been selected.

Figure 3D:
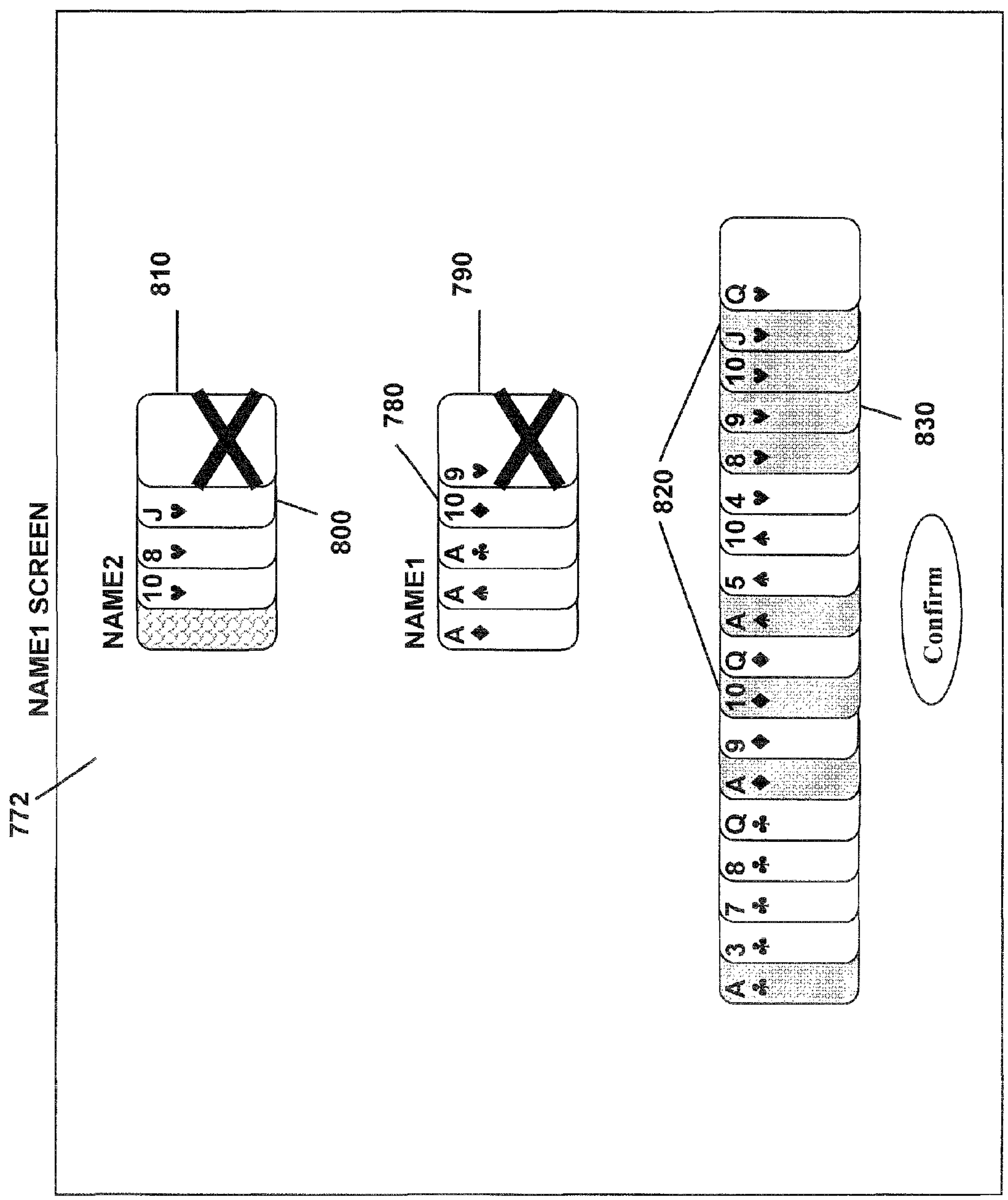
FIG. 3D shows the first player's screen, for the same game as FIG. 3A, at the end of 5 card selection rounds.

FIG. 3D shows NAME1's screen 772 at the start of round six. NAME1 did select and was dealt the diamond ten 780 on round four. In round five NAME1 selected the heart nine and was dealt a null card 790. We see that NAME2 was dealt the heart jack 800 in round four and a null card 810 in round five. NAME1 now knows that NAME2 either was dealt the heart nine in round one or selected the heart nine in round five, and was blocked. If NAME2 had been dealt the heart nine in round one, then it would be reasonable for NAME1 to assume that NAME2's fifth round selection was the diamond ace, to try to prevent NAME1 from getting a full house. NAME1 must decide on round six whether to try for a full house or try to block NAME2 from getting a flush or straight flush. Both the diamond ten and the heart jack are now shadowed-out 820 in the card selection deck. Also, the heart nine 830 is shadowed-out in the deck, even though it hasn't been dealt, because a card is no longer available for subsequent selection once it has been selected on a previous round.

Figure 3E:
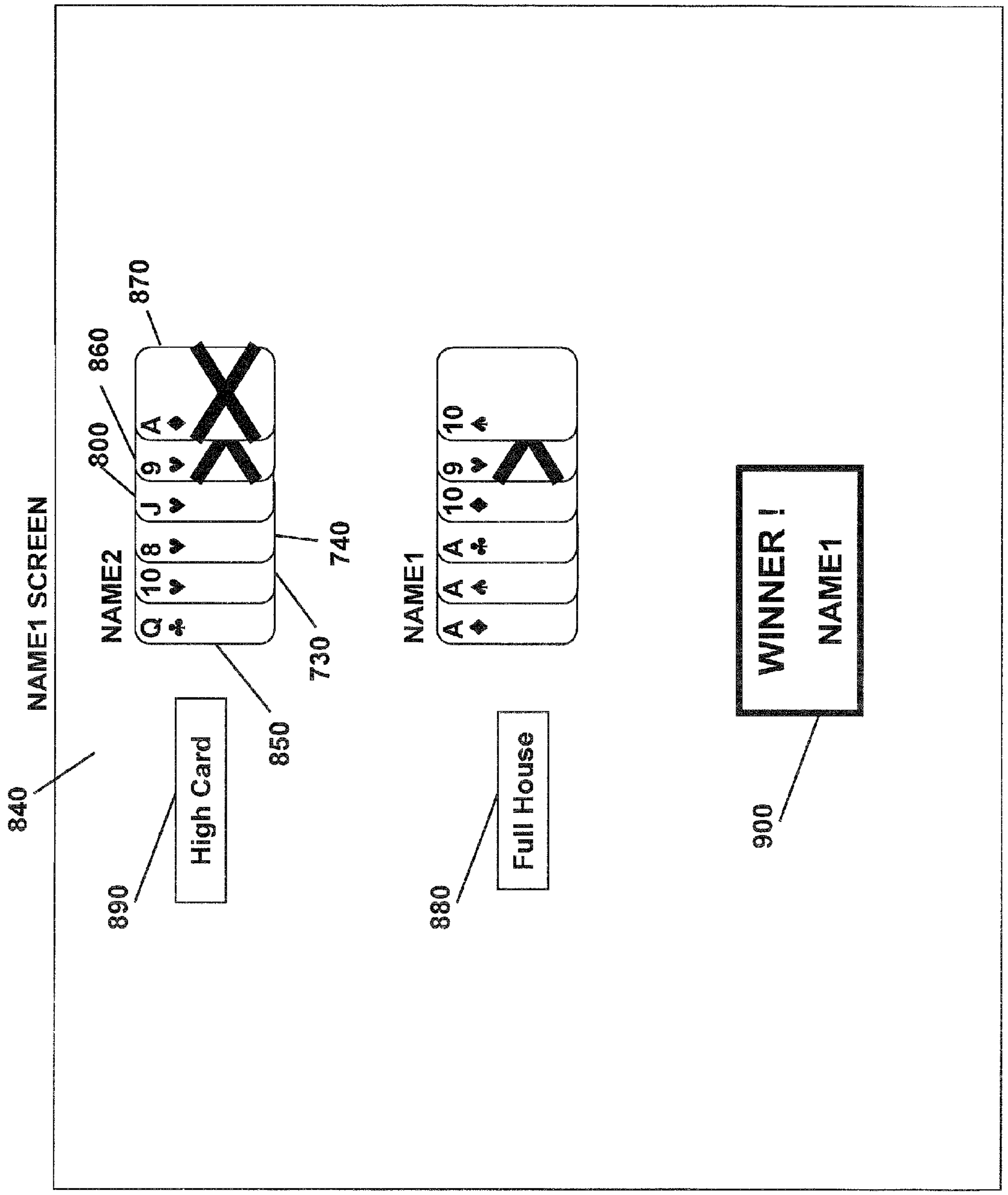
FIG. 3E shows the first player's screen, for the same game as FIG. 3A, after all 6 card selection rounds have been completed and a winner is declared.

FIG. 3E is the final NAME1 screen 840 for this hand. It displays the rank and suit of every card selected by every player on every round, regardless of whether the card was dealt face down or blocked. NAME1 was dealt the spade ten 840 in round six, to complete a full house with 3 aces and 2 tens. NAME2 was dealt the club queen 850 in round one. From rounds two thru four NAME2 was on course for a straight flush, selecting and being dealt in succession the heart ten 730, heart eight 740 and heart jack 800. However, in round five, NAME2's selection of the heart nine 860 got blocked. Then on round six, NAME2 futility tried to block NAME1 by selecting the diamond ace 870. Even if NAME2 had been successful, it was too late for NAME2 to win. The final results show that NAME1 got a Full House 880 and NAME2's best hand is club queen High Card 890. NAME1 is the winner 900 with the best poker hand.

Figure 3F:
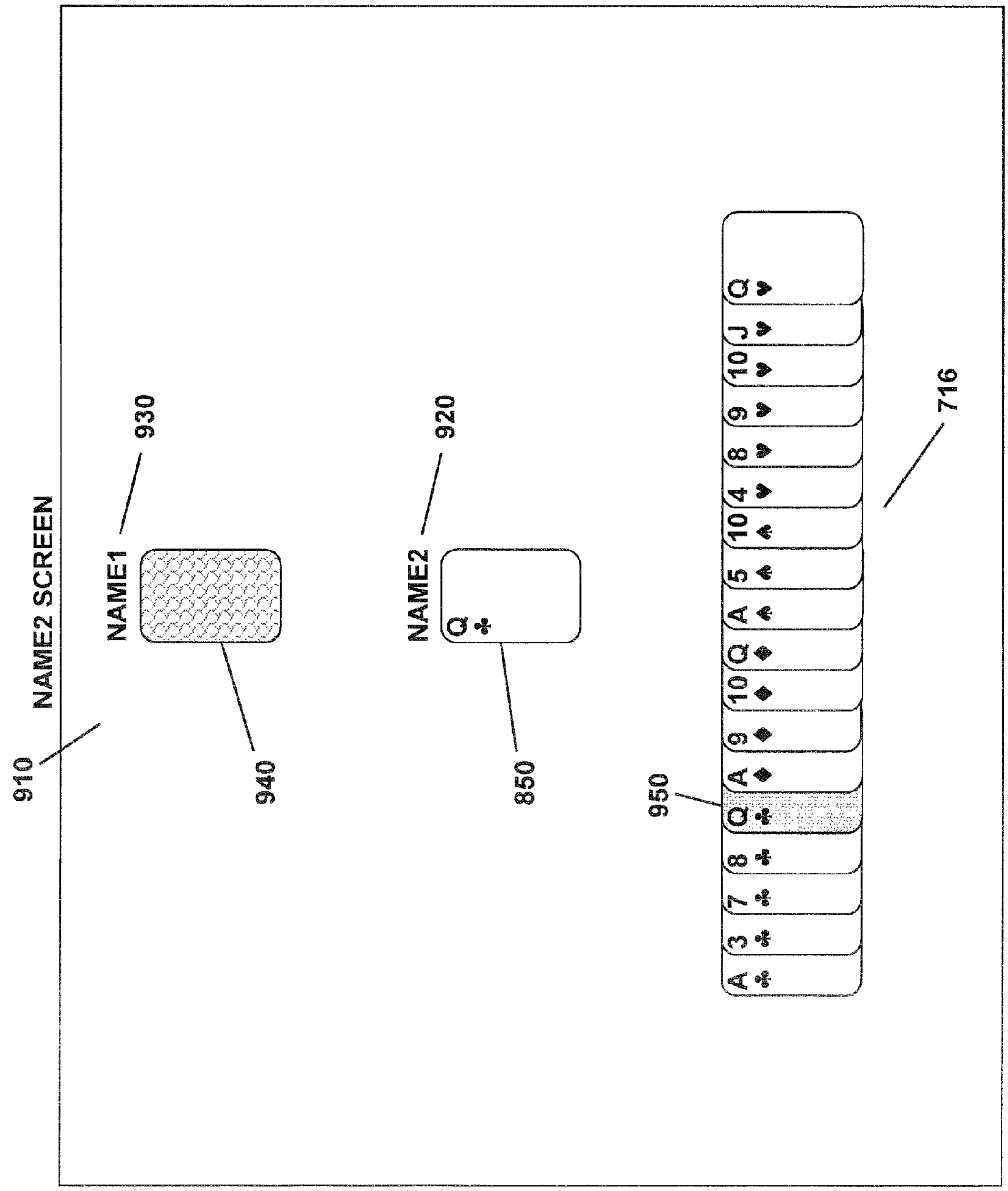
FIG. 3F shows a second player's screen, for the same game as FIG. 3A, at the end of the first card selection round.
Figure 3G:
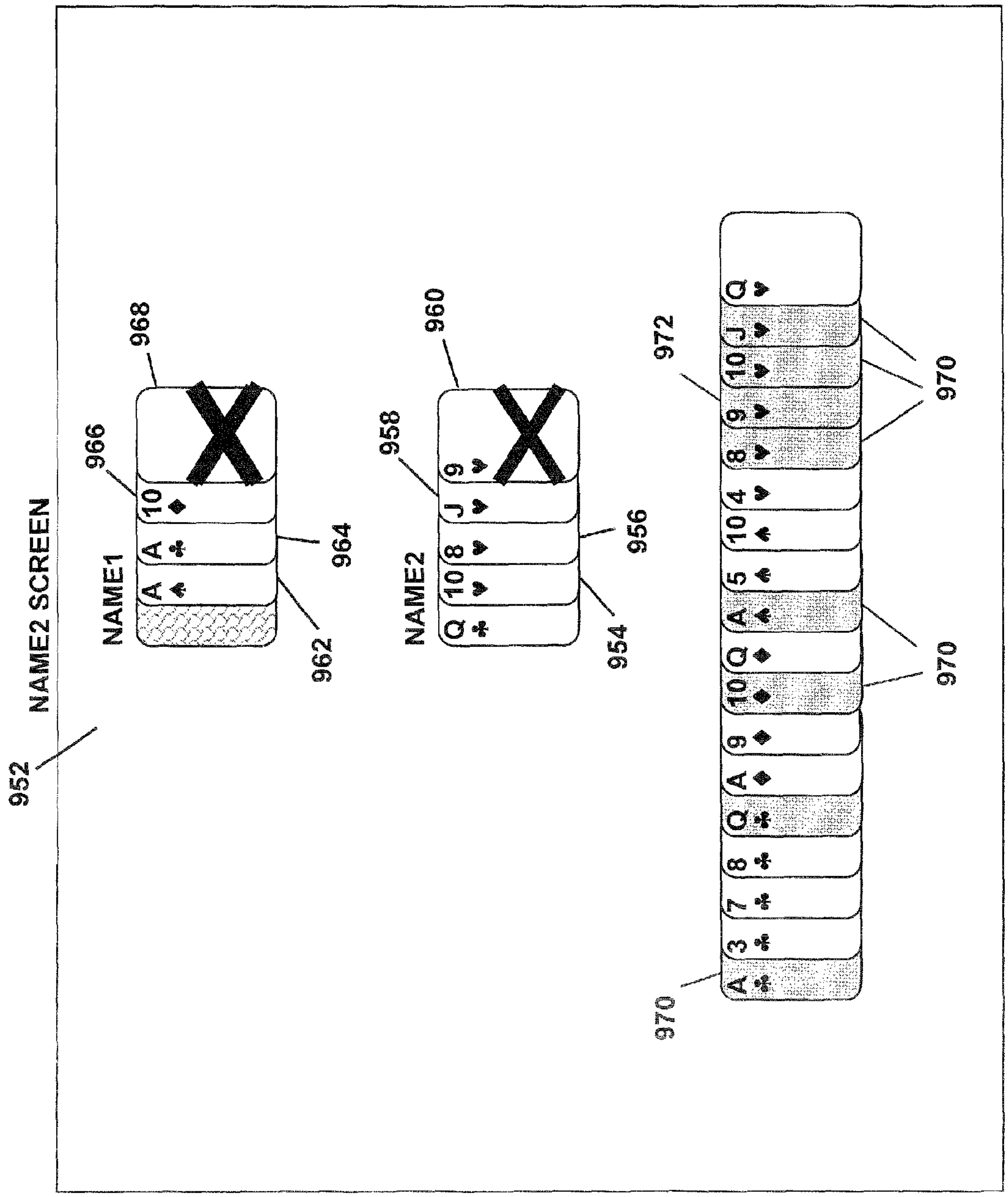
FIG. 3G shows the second player's screen, for the same game as FIG. 3A, at the end of 5 card selection rounds.

FIGS. 3F-G show NAME2's screen for this example when NAME2 is an actual player. FIG. 3F shows NAME2's screen 910 at the start of round two, and the different positions of NAME2 920 and NAME1 930 compared to NAME1's screen. NAME2 selected the club queen 850 from the first deck and was dealt that card in round one. Name2 does not know what card NAME1 was dealt because round one cards were dealt face down 940. From round two on, NAME2 selects cards from the same second deck 716 used by NAME1. For NAME2, the club queen 950 is now shadowed-out in the second deck because NAME2 knows it has already been selected.

FIG. 3G shows NAME2's screen 952 at the start of round six. The heart ten 954, heart eight 956 and heart jack 958 dealt to NAME2 in rounds two thru four are the same as shown on NAME1's screen 772. Similarly, the spade ace 962, club ace 964 and diamond ten 966 dealt to NAME1 in rounds two thru four are the same as shown on NAME1's screen 772. NAME1 was dealt a null card 968 in round six. In round six NAME2's selection of the heart nine was blocked 960. Even though the heart nine might not have been dealt, it is shadowed-out 972 in the card selection deck, since once a card has been selected it cannot be selected and dealt in a subsequent round. The club ace, diamond ten, spade ace, heart eight, heart ten and heart jack are also shadowed-out 970 in the card selection deck, because NAME2 knows these cards can no longer be selected.

While particular embodiments of the present invention have been shown and described, it will be obvious to those skilled in the art that changes and modifications may be made without departing from this invention in its broader aspects and, therefore, the appended claims are to encompass within their scope all changes and modifications that fall within the true spirit and scope of the invention.

What is claimed is:

1. A method for playing a card game on a computing device having a display screen (90), the computing device being programmed to carry out the card game using physical card representations stored in a memory for a first deck of playing cards, the program enabling an actual player to play the card game against at least one virtual player controlled by the computing device, a player remaining in the card game being defined as an active player, the method comprising:

a) randomly selecting cards, by the computing device, from the first deck of playing cards to form a second deck of playing cards that contains fewer cards than the first deck of playing cards;

b) displaying to the actual player on the display screen (90) one or more cards randomly dealt face up (100, 110, 120), the one or more randomly dealt cards being community cards usable by all players in forming a card hand;

c) displaying to the actual player on the display screen (90) at least a portion of the second deck of playing cards face up (160);

d) selecting by each active player a desired card of a particular rank and suit from the second deck of cards excluding the randomly dealt cards in step (b), where an active, actual player uses a computer interface to make his/her card selection;

e) for each active player, determining if the card selected by that player is the same as a card selected by another player in a current round or the same as a card dealt to another player on a previous round;

f) if a first player chose the same card as another player, as determined in step (e), dealing the first player a null card that has no value in forming a card hand, wherein, if the first player is the actual player (264), the null card (270) is displayed on the display screen (262) along with the rank and suit of the corresponding card the actual player selected, wherein, if the first player is a virtual player (282) and the null card is dealt face up, the null card (290) is displayed on the display screen (262) with no display of the rank and suit of the corresponding card selected by the virtual player, so that the actual player does not see the identity of the corresponding card selected by the first player;

g) if the first player did not choose the same card as another player, as determined in step (d), dealing the first player the card that the first player selected, wherein, the display screen (222) displays the order and identity of every card selected by the actual player and the order of every card dealt to every virtual player along with the identity of every card dealt face up;

h) repeating steps d-g if there is more than one active player after a round of play, until the same predetermined number of cards have been dealt to each active player; and i) controlling the display screen (302) to identify the active player with the best hand of cards, according to predetermined rules of play.

2. The method of claim 1 wherein step (e) comprises:

e) for each active player, determining if the card selected by that player is the same as a card selected by another player in a current round or a previous round.

3. The method of claim 2 wherein step (i) comprises:

i) controlling the display screen (302) to identify the active player with the best hand of cards, made from at least one randomly dealt card in step (b) and at least one card dealt to that player, according to predetermined rules of play.

4. The method of claim 1 wherein step (i) comprises:

i) controlling the display screen (302) to identify the active player with the best hand of cards, made from at least one randomly dealt card in step (b) and at least one card dealt to that player, according to predetermined rules of play.

5. A method for playing the same card game on multiple computing devices in a playing session consisting of one or more hands, each computing device having a display screen (90, 500), each computing device being programmed to carry out the card game using physical card representations for a first deck of playing cards stored in a memory, the first deck of cards being the same for each computing device, the program enabling an actual player on each computing device to play the card game against at least one virtual player controlled by the computing device, at the start of each hand the number of virtual players being the same for each of the multiple computing devices, a player remaining in a hand of the card game being defined as an active player, the method comprising:

a) randomly selecting cards, by the multiple computing devices, from the first deck of playing cards to form a second deck of playing cards that contains fewer cards than the first deck of cards, the second deck of playing cards being the same for each of the multiple computing devices;

b) displaying to each active, actual player on that player's display screen (90, 500) one or more cards randomly dealt face up (502, 504, 506), the one or more randomly dealt cards being the same from computing device to computing device, the one or more randomly dealt cards being community cards usable by all players in forming a card hand;

c) displaying to each active, actual player on that player's display screen (90, 500) at least the same portion of the second deck of playing cards face up (160, 514);

d) selecting by each active player a desired card of a particular rank and suit from the second deck of cards excluding the randomly dealt cards in step (b), where an active, actual player uses a computer interface to make his/her card selection;

e) if two or more active, actual players either have selected the same sequence of cards and bets for all previous rounds, or have selected no cards previously, then their respective computing devices insure that for each set of their corresponding active, virtual players, the virtual players select the same card in rank and suit for the current round, to maintain a level playing field;

f) for each active player, determining if the card selected by that player is the same as a card selected by another player in a current round or the same as a card dealt to another player on a previous round, playing on the same computing device;

g) if a first player chose the same card as another player, as determined in step (f), dealing the first player a null card that has no value in forming a card hand, wherein, if the first player is an actual player, the null card (270, 544) is displayed on the actual player's display screen (262, 542) along with the rank and suit of the corresponding card the first player selected, wherein, if the first player is a virtual player and the null card is dealt face up, the null card (280, 536) is displayed on the display screen (262, 518) of the actual player playing on the same computing device as the first player, with no display of the rank and suit of the corresponding card selected by the first player, so that the associated actual player does not see the identity of the corresponding card selected by the first player;

h) if the first player did not choose the same card as another player, as determined in step (f), dealing the first player the card that the first player selected, wherein, each actual player's display screen (222, 518) displays the order and identity of every card selected by that player and the order of every card dealt along with the identity of every card dealt face up, to each virtual player controlled by the same computing device;

i) repeating steps d-h on a computing device having more than one active player playing after a round of play, until the same predetermined number of cards have been dealt to each active player, playing on the same computing device;

j) controlling the display screen (570, 542) of each computing device to identify the active player with the best hand of cards played on that computing device for the current hand, according to predetermined rules of play;

k) controlling the display screen (570, 542) of each computing device to indicate the numerical score received by the associated actual player for the current hand (574, 566), calculated according to predetermined rules of play;

l) repeating steps (a) through (k) until the playing session ends; and m) controlling the display screen (694, 698) of each computing device to identify the actual player with the highest cumulative score of all the actual players for all the hands played (696, 700).

6. The method of claim 5 wherein step (f) comprises:

f) for each active player, determining if the card selected by that player is the same as a card selected by another player in a current round or a previous round, playing on the same computing device.

7. The method of claim 6 wherein step (j) comprises:

j) controlling the display screen (570, 542) of each computing device to identify the active player with the best hand of cards played on that computing device for the current hand, made from at least one randomly dealt card in step (b) and at least one card dealt to that player, according to predetermined rules of play.

8. The method of claim 5 wherein step (j) comprises:

j) controlling the display screen (570, 542) of each computing device to identify the active player with the best hand of cards played on that computing device for the current hand, made from at least one randomly dealt card in step (b) and at least one card dealt to that player, according to predetermined rules of play.

9. A method for playing the same card game on multiple computing devices, each having a display screen (90, 404, 450), each computing device being programmed to carry out the card game using physical card representations stored in a memory for a first deck of playing cards, the first deck of cards being the same for each computing device, the program enabling an actual player using one of the computing devices to play the card game against at least one other actual player using another one of the computing devices, a player remaining in the game being defined as an active player, the method comprising:

a) randomly selecting cards, by the multiple computing devices, from the first deck of playing cards to form a second deck of playing cards that contains fewer cards than the first deck of cards, the second deck of playing cards being the same for each of the multiple computing devices;

b) displaying to each actual player on that player's display screen (90, 404, 450) one or more cards randomly dealt face up (100, 110, 120), the one or more randomly dealt cards being the same for each computing device, the one or more randomly dealt cards being community cards usable by all players in forming a card hand;

c) displaying to each actual player on that player's display screen (90, 404, 450) at least the same portion of the second deck of playing cards face up (160);

d) selecting by each active player a desired card of a particular rank and suit from the second deck of playing cards excluding the randomly dealt cards in step (b), where an active, actual player uses a computer interface to make his/her card selection;

e) for each active player, determining if the card selected by that player is the same as a card selected by another player in a current round or the same as a card dealt to another player on a previous round;

f) if a first player chose the same card as another player, as determined in step (e), dealing the first player a null card that has no value in forming a card hand, wherein, if the first player is an actual player, the null card (270, 416, 464) dealt to the first player is displayed on the first player's display screen (262, 414, 450) along with the rank and suit of the card the first player selected, wherein, if cards are dealt face up in the current round, the null card dealt to the first player (290) is displayed on the display screen (262) of each actual player, other than one that is the first player, with no display of the rank and suit of the card selected by the first player, so that each actual player, other than one that is the first player, does not see the identity of the corresponding card selected by the first player;

g) if the first player did not choose the same card as another player, as determined in step (e), dealing the first player the card that the first player selected, wherein, if the first player is an actual player, the rank and suit of the card dealt to the first player (230, 320, 250) are displayed on the first player's display screen (222, 414, 450), wherein, if cards are dealt face up in the current round, the rank and suit of the card dealt to the first player (240) are displayed on the display screen (222) of each of the actual players;

h) repeating steps d-g if there is more than one active player after a round of play, until the same predetermined number of cards have been dealt to each active player; and i) controlling the display screen (302) of each actual player to identify the active player with the best hand of cards, according to predetermined rules of play.

10. The method of claim 9 wherein step (e) comprises:

e) for each active player, determining if the card selected by that player is the same as a card selected by another player in a current round or a previous round.

11. The method of claim 10 wherein step (i) comprises:

h) controlling the display screen (302) of each actual player to identify the active player with the best hand of cards, made from at least one randomly dealt card in step (b) and at least one card dealt to that player, according to predetermined rules of play.

12. The method of claim 10 further comprising the step after step (g) and before step (h) of displaying to each actual player on that player's display screen one or more cards randomly dealt face up, the one or more randomly dealt cards being the same for each computing device, the one or more randomly dealt cards being community cards usable by all active players in forming a card hand.

13. The method of claim 9 wherein step (i) comprises:

h) controlling the display screen (302) of each actual player to identify the active player with the best hand of cards, made from at least one randomly dealt card in step (b) and at least one card dealt to that player, according to predetermined rules of play.

14. The method of claim 9 further comprising the step after step (g) and before step (h) of displaying to each actual player on that player's display screen one or more cards randomly dealt face up, the one or more randomly dealt cards being the same for each computing device, the one or more randomly dealt cards being community cards usable by all active players in forming a card hand.

15. A method for playing a card game on a computing device having a display screen (702), the computing device being programmed to carry out the card game using card representations stored in a memory, the program enabling an actual player to play the card game against at least one virtual player on the computing device, a player remaining in the game being defined as an active player, the card game involving two or more rounds of play in which each active player selects a card, the method comprising:

a) displaying to the actual player on the display screen (702) a first deck of playing cards (708) face up, the first deck of playing cards being a representation of a physical deck of playing cards;

b) selecting by each player a desired card of a particular rank and suit from the first deck of playing cards, where an active, actual player uses a computer interface to make his/her card selection;

c) for each player, determining if the card selected by that player is the same as a card selected by another player;

d) if a first player chose the same card as another player, as determined in step (c), dealing the first player a null card that has no value in forming a card hand, wherein, if the first player is the actual player, the null card is displayed on the actual player's display screen along with the rank and suit of the card that the first player selected, wherein, if the first player is a virtual player and cards are dealt face up in the current round, the null card is displayed on the actual player's display screen with no display of the rank and suit of the card selected by the first player, so that the actual player does not see the identity of the corresponding card selected by the first player;

e) if the first player did not choose the same card as another player, dealing the first player the card that the first player selected, wherein, if the first player is the actual player, the rank and suit of the card dealt to the first player (718) are displayed on the display screen (714), wherein, if the first player is a virtual player and cards are dealt face up, the rank and suit of the card dealt to the first player are displayed on the display screen;

f) displaying to the actual player on the display screen (714) a second deck of playing cards face up, the second deck of cards (716) containing all cards selected in step (b) plus cards randomly selected from the first deck of cards, the second deck of cards containing fewer cards than the first deck of cards;

g) selecting by each active player a desired card of a particular rank and suit from the second deck of playing cards, where an active, actual player uses a computer interface to make his/her card selection;

h) for each active player, determining if the card selected by that player is the same as a card selected by another player in a current round or the same as a card dealt to another player in a previous round;

i) if a first player chose the same card as another player, as determined in step (h), dealing the first player a null card that has no value in forming a card hand, wherein, if the first player is the actual player, the null card (790) dealt to the first player is displayed on the display screen (772) along with the rank and suit of the card the first player selected, wherein, if the first player is a virtual player and cards are dealt face up in the current round, the null card (810) dealt to the first player is displayed on the display screen (772) with no display of the rank and suit of the card selected by the first player, so that the actual player does not see the identity of the corresponding card selected by the first player;

j) if the first player did not choose the same card as another player, as determined in step (h), dealing the first player the card that the first player selected, wherein, if the first player is the actual player, the rank and suit of the card dealt to the first player (718) are displayed on the display screen (714), wherein, if the first player is a virtual player and cards are dealt face up in the current round, the rank and suit of the card dealt to the first player (730) are displayed on the display screen (724);

k) repeating steps g-j if there is more than one active player after a round of play, until the same predetermined number of cards have been dealt to all active players, and;

l) controlling the display screen (840) to identify the active player with the best hand of cards (900), according to predetermined rules of play.

16. The method of claim 15 wherein step (h) comprises:

h) for each active player, determining if the card selected by that player is the same as a card selected by another player in a current round or a previous round.

17. A method for playing the same card game on multiple computing devices each having a display screen (714, 910), each computing device being programmed to carry out the card game using card representations stored in a memory, the program enabling an actual player using one of the computing devices to play the card game against at least one other actual player using another one of the computing devices, a player remaining in the game being defined as an active player, the card game involving two or more rounds of play where each active player selects a card, the method comprising:

a) displaying to each actual player on that player's display screen the same first deck of playing cards face up, the first deck of playing cards being a representation of a physical deck of playing cards;

b) selecting by each actual player a desired card of a particular rank and suit from the first deck of playing cards, where an active, actual player uses a computer interface to make his/her card selection;

c) for each player, determining if the card selected by that player is the same as a card selected by another player;

d) if a first player chose the same card as another player, as determined in step (c), dealing the first player a null card that has no value in forming a card hand, wherein, if the first player is an actual player, the null card is displayed on the first player's display screen showing the rank and suit of the card that the first player selected, wherein, if the cards are dealt face up in the current round, the null card is displayed on the display screen of each actual player, other than one that is the first player, with no display of the rank and suit of the card selected by the first player, so that each actual player, other than one that is the first player, does not see the identity of the corresponding card selected by the first player;

e) if the first player did not choose the same card as another player, as determined in step (c), dealing the first player the card that the first player selected, wherein, if the first player is an actual player, the rank and suit of the card dealt to the first player (718, 850) are displayed on the first player's display screen (714, 910), wherein, if cards are dealt face up in the current round, the rank and suit of the card dealt to the first player are displayed on each actual player's display screen;

f) displaying to each actual player on that player's display screen (714, 910) a second deck of playing cards (716), the second deck of cards containing all cards selected in step (b) plus cards randomly selected from the first deck of cards, the second deck of cards being the same from computing device to computing device, the second deck of cards containing fewer cards than the first deck of cards;

g) selecting by each active, actual player using a computer interface a desired card of a particular rank and suit from the second deck of playing cards;

h) for each active player, determining if the card selected by that player is the same as a card selected by another player in a current round or the same as a card dealt to another player on a previous round;

i) if a first player chose the same card as another player, as determined in step (h), dealing the first player a null card that has no value in forming a card hand, wherein, if the first player is an actual player, the null card (790, 960) is displayed on the first player's display screen (772, 952) showing the rank and suit of the card that the first player selected, wherein, if cards are dealt face up in the current round, the null card (810, 968) is displayed on the display screen (772, 952) of each actual player, other than one that is the first player, with no display of the rank and suit of the card selected by the first player, so that each actual player, other than one that is the first player, does not see the identity of the corresponding card selected by the first player;

j) if a first player did not choose the same card as another player, as determined in step (h), dealing the first player the card that the first player selected, wherein, if the first player is an actual player, the rank and suit of the card dealt to the first player (726, 954) are displayed on the first player's display screen (724, 952), wherein, if cards are dealt face up in the current round, the rank and suit of the card dealt to the first player (740, 962) are displayed on each actual player's display screen (724, 952);

k) repeating steps g-j if there is more than one active player playing after a round of play, until the same predetermined number of cards have been dealt to each active player; and l) controlling the display screen of each computing device to identify the active player with the best hand of cards, according to predetermined rules of play.

18. The method of claim 17 wherein step (h) comprises:

h) for each active player, determining if the card selected by that player is the same as a card selected by another player in a current round or a previous round.

19. The method of claim 18 further comprising the step after step (k) and before step (l) of displaying to each actual player on that player's display screen one or more cards randomly dealt face up, the one or more randomly dealt cards being the same for each computing device, the one or more randomly dealt cards being community cards usable by all active players in forming a card hand.

20. The method of claim 17 further comprising the step after step (k) and before step (l) of displaying to each actual player on that player's display screen one or more cards randomly dealt face up, the one or more randomly dealt cards being the same for each computing device, the one or more randomly dealt cards being community cards usable by all active players in forming a card hand.

21. A method for playing a card game on a computing device having a display screen, the computing device being programmed to carry out the card game using card representations stored in a memory, the program enabling an actual player to play the card game against at least one virtual player controlled by the computing device, a player remaining in the game being defined as an active player, the method comprising:

a) displaying to the actual player on the display screen one or more randomly dealt community cards from a deck of playing cards, the one or more community cards being usable by all players in forming a card hand, all community cards in the card game being randomly dealt before any cards are dealt to individual players, the deck of playing cards being a representation of a physical deck of cards, the display screen displaying at least a portion of the deck of playing cards face up;

b) if the actual player is active, selecting by the actual player using a computer interface a desired card of a particular rank and suit from the deck of playing cards excluding the randomly dealt cards in step (a);

c) selecting by each active, virtual player a card of a particular rank and suit from the deck of playing cards excluding the randomly dealt cards in step (a);

d) for each active player, determining if the card selected by that player is the same as a card selected by another player in a current round or the same as a card dealt to another player in a previous round;

e) if a first player chose the same card as another player, as determined in step (d), dealing the first player a null card that has no value in forming a card hand, wherein, if the first player is an actual player, the null card is displayed on the display screen along with the rank and suit of the corresponding card the first player selected, wherein, if the first player is a virtual player and the null card is dealt face up, the null card is displayed on the display screen with no display of the rank and suit of the corresponding card selected by the first player, so that the actual player does not see the identity of the corresponding card selected by the virtual player;

f) if the first player did not choose the same card as another player, as determined in step (d), dealing the first player the card that the first player selected, wherein, the display screen displays the order and identity of every card selected by the actual player and the order of every card dealt to every virtual player along with the identity of every card dealt face up;

g) repeating steps b-f if there is more than one active player after a round of play, until the same predetermined number of cards have been dealt to each active player; and h) controlling the display screen to identify the active player with the best hand of cards, according to predetermined rules of play.

22. The method of claim 21 wherein step (d) comprises:

d) for each active player, determining if the card selected by that player is the same as a card selected by another player in a current round or a previous round.

23. A method for playing the same card game on multiple computing devices each having a display screen, each computing device being programmed for a single actual player to carry out the card game using card representations stored in a memory, the program enabling each actual player to play the card game against at least one virtual player controlled by the same computing device, where the number of virtual players is the same for each of the multiple computing devices, a player remaining in the game being defined as an active player, the method comprising:

a) displaying to each actual player on that player's display screen the same one or more randomly dealt community cards from the same deck of playing cards, the one or more community cards being usable by all players in forming a card hand, all community cards in the card game being randomly dealt before any cards are dealt to individual players, the deck of playing cards being a representation of a physical deck of cards, each actual player's display screen displaying at least the same portion of the deck of playing cards face up;

b) selecting by each active, actual player using a computer interface a desired card of a particular rank and suit from the deck of playing cards excluding the randomly dealt cards in step (a);

c) selecting by each active, virtual player a card of a particular rank and suit from the deck of playing cards excluding the randomly dealt cards in step (a);

d) if two or more active, actual players either have selected the same sequence of cards and bets for all previous rounds, or have selected no cards previously, then their respective computing devices insure that for each set of their corresponding active, virtual players, the players for that set select the same card in rank and suit for the round, to maintain a level playing field;

e) for each active player, determining if the card selected by that player is the same as a card selected by another player in a current round or the same as a card dealt to another player in a previous round, playing on the same computing device;

f) if a first player chose the same card as another player, as determined in step (e), dealing the first player a null card that has no value in forming a card hand, wherein, if the first player is an actual player, the null card is displayed on the first player's display screen along with the rank and suit of the corresponding card the first player selected, wherein, if the first player is a virtual player and the null card is dealt face up, the null card is displayed on the display screen of the actual player playing on the same computing device as the first player, with no display of the rank and suit of the corresponding card selected by the virtual player, so that the actual player does not see the identity of the corresponding card selected by the first player;

g) if the first player did not choose the same card as another player, as determined in step (e), dealing the first player the card that the first player selected, wherein, each actual player's display screen displays the order and identity of every card selected by that player and the order of every card dealt along with the identity of every card dealt face up to each virtual player controlled by the same computing device;

h) repeating steps b-g on a computing device having more than one active player playing after a round of play, until the same predetermined number of cards have been dealt to each active player, playing on the computing device; and i) controlling the display screen to identify the player with the best hand of cards of all the active, actual players, according to predetermined rules of play.

24. The method of claim 23 wherein step (e) comprises:

e) for each active player, determining if the card selected by that player is the same as a card selected by another player in a current round or a previous round, playing on the same computing device.

25. A method for playing the same card game on multiple computing devices each having a display screen, the computing devices being programmed to carry out the card game using card representations stored in a memory, the program enabling an actual player using one of the computing devices to play the card game against at least one other actual player using another one of the computing devices, a player remaining in the game being defined as an active player, the method comprising:

a) displaying to each actual player on that player's display screen the same one or more randomly dealt community cards from the same deck of playing cards, the one or more community cards being usable by all players in forming a card hand, all community cards in the card game being randomly dealt before any cards are dealt to individual players, the deck of playing cards being a representation of a physical deck of cards, each actual player's display screen displaying at least the same portion of the deck of playing cards face up;

b) selecting by each active player a desired card of a particular rank and suit from the deck of playing cards excluding the randomly dealt cards in step (a);

c) for each active player, determining if the card selected by that player is the same as a card selected by another player in a current round or the same as a card dealt to another player in a previous round;

d) if a first player chose the same card as another player, as determined in step (c), dealing the first player a null card that has no value in forming a card hand, wherein, if the first player is an actual player, the null card is displayed on the first player's display screen along with the rank and suit of the corresponding card the first player selected, wherein, if the first player is an actual player and a null card is dealt face up to another player, that null card is displayed on the first player's display screen with no display of the rank and suit of the corresponding card selected by another player, so that the first player does not see the identity of the corresponding card selected by another player;

e) if the first player did not choose the same card as another player, as determined in step (c), dealing the first player the card that the first player selected, wherein, each actual player's display screen displays the order and identity of every card selected by that player and the order of every card dealt to every other player along with the identity of every card dealt face up;

f) repeating steps b-e if there is more than one active player after a round of play, until the same predetermined number of cards have been dealt to each active player; and g) controlling the display screen to identify the active player with the best hand of cards, according to predetermined rules of play.

26. The method of claim 25 wherein step (c) comprises:

c) for each active player, determining if the card selected by that player is the same as a card selected by another player in a current round or a previous round.

27. The method of claim 26 further comprising the step after step (f) and before step (g) of displaying to each actual player on that player's display screen one or more cards randomly dealt face up, the one or more randomly dealt cards being the same for each computing device, the one or more randomly dealt cards being community cards usable by all active players in forming a card hand.

28. The method of claim 25 further comprising the step after step (f) and before step (g) of displaying to each actual player on that player's display screen one or more cards randomly dealt face up, the one or more randomly dealt cards being the same for each computing device, the one or more randomly dealt cards being community cards usable by all active players in forming a card hand.

* * * * *